US008009919B2

(12) United States Patent
Baiping et al.

(10) Patent No.: US 8,009,919 B2
(45) Date of Patent: Aug. 30, 2011

(54) IMAGE MANAGING APPARATUS AND IMAGE DISPLAY APPARATUS

(75) Inventors: Liao Baiping, Saitama (JP); Ichiro Ueno, Saitama (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 11/559,695

(22) Filed: Nov. 14, 2006

(65) Prior Publication Data

US 2007/0139546 A1  Jun. 21, 2007

(30) Foreign Application Priority Data

Dec. 6, 2005  (JP) ................................ 2005-351401

(51) Int. Cl.
*G06K 9/62* (2006.01)
(52) U.S. Cl. .................. 382/225; 348/333.01
(58) Field of Classification Search ................. 382/225, 382/228; 348/232
See application file for complete search history.

(56) References Cited

U.S. PATENT DOCUMENTS

| 2001/0022621 A1 | 9/2001 | Squibbs |
| 2002/0120395 A1 | 8/2002 | Smith |
| 2005/0134939 A1 * | 6/2005 | Ikeda et al. ............ 358/471 |

FOREIGN PATENT DOCUMENTS

| EP | 1 067 731 A2 | 1/2001 |
| EP | 1 705 583 A1 | 9/2006 |
| JP | 5-128166 | 5/1993 |
| JP | 10-233985 | 9/1998 |
| JP | 2001-228528 | 8/2001 |
| JP | 2003-18506 | 1/2003 |
| JP | 2003-44486 | 2/2003 |
| JP | 2003-44491 | 2/2003 |
| WO | WO 98/54896 | 12/1998 |
| WO | WO 2005/069170 A1 | 7/2005 |

OTHER PUBLICATIONS

Naaman et al: "Automatic organization for digital photographs with geographic coordinates", Proc. of 2004 ACM/IEEE Conference, pp. 53-62.*
U.S. Appl. No. 11/563,867, filed Nov. 28, 2006, Baiping et al.
Michael Harville, et al. "MediaBeads: An Architecture for Path-Enhanced Media Applications", IEEE International Conference on Multimedia and Expo, XP-002304362, Jun. 27-30, 2004, pp. 1-5.
Japanese Office Action issued Feb. 8, 2011, in Patent Application No. 2005-351401.

* cited by examiner

*Primary Examiner* — Samir A Ahmed
*Assistant Examiner* — Ruiping Li
(74) *Attorney, Agent, or Firm* — Oblon, Spivak, McClelland, Maier & Neustadt, L.L.P.

(57) ABSTRACT

An image display apparatus includes: an image information storage that stores image information including locations where images are captured as information corresponding to captured image data; a cluster managing section that manages the image information with hierarchical clusters including a plurality of clusters configured in a plurality of layers; a display layer designation section that designates a layer to be displayed as a display layer among from an uppermost layer through a lowermost layer in the plurality of layers; a display condition designation section that designates a display condition of the image data; a conditional filtering section that selects such image data in the display layer that the image information thereof exists within a predetermined range based on the display condition; and a drawing section that draws in the display layer, as an image location display, the image captured locations of the image data selected based on the image information.

14 Claims, 21 Drawing Sheets

LAYER1 LEVEL1
LAYER1 LEVEL2

WORLD MAP

LAYER2 LEVEL1
LAYER2 LEVEL2

WORLD AREA MAP

LAYER3 LEVEL1
LAYER3 LEVEL2

COUNTRY MAP

LAYER4 LEVEL1
LAYER4 LEVEL2

REGIONAL MAP

LAYER5 LEVEL1
LAYER5 LEVEL2

CITY OUTLINE MAP

LAYER6 LEVEL1
LAYER6 LEVEL2

DETAILED CITY MAP

FIG. 17

| TIMES CAPTURED / CLUSTERS | 2003 | 2004 | 2005 |
|---|---|---|---|
| HONGO | 40 | 40 | 0 |
| UENO PARK | 20 | 20 | 40 |
| IRIYA | 80 | 0 | 0 |

FIG. 18

|  | FILTERING START TIME | | | FILTERING END TIME | | |
|---|---|---|---|---|---|---|
| 571 ⊠ | 2004 | ↕ | YEAR | 581 ⊠ | 2005 | ↕ YEAR |
| ⊠ | SPRING | ↕ | SEASONS | ⊠ | SPRING | ↕ SEASONS |
| ☐ | 4 | ↕ | MONTH | ☐ | 4 | ↕ MONTH |
| ☐ | 1 | ↕ | DATE | ☐ | 1 | ↕ DATE |
| ☐ | 12 | ↕ | HOUR | ☐ | 12 | ↕ HOUR |
| ☐ | 0 | ↕ | MINUTE | ☐ | 0 | ↕ MINUTE |

(labels: 572, 573, 582, 583)

IMAGE MANAGING APPARATUS AND IMAGE DISPLAY APPARATUS

BACKGROUND OF THE INVENTION

1. Field of the Invention

The present invention relates to an image managing apparatus and an image display apparatus, and, in particular, it relates to an image managing apparatus for arranging captured images hierarchically and displaying so, a method of processing thereof, and a program thereof to be executed by a computer.

2. Description of Related Art

Nowadays, many types of image capturing apparatuses have pervaded so that many users are able to capture images at ease. Since pictures can be taken via a simple operation, and the users often take pictures of street sights, sceneries and so on at will, as a result, an enormous quantity of image data continues to be accumulated.

If such a large volume of image data is accumulated, even the user who took the pictures is difficult to remember all the locations of images captured. Therefore, it becomes necessary somehow to associate captured image data with its location. For example, there is proposed a recording system for recording image data captured by a camera section in association with a position data obtained from GPS (Global Positioning System), as disclosed in Japanese Patent Application Publication No. 2003-18506 (FIG. 1).

SUMMARY OF THE INVENTION

In order to arrange image data in a space on the basis of the position data recorded in association with the image data as described above, it is useful to gather together nearby data having a shortest distance therebetween into a group in a feature space. As such a method, a hierarchical clustering algorithm is known. The hierarchical clustering algorithm is a grouping method wherein data thereof are managed via a tree structure called a cluster tree, and nearby data are grouped under the same node.

However, with a hierarchical clustering algorithm of related art, a one-to-one distance calculation is required for every data, and since its quantity of calculation requires a square order of its image data, if an object image data increases, a quantity of its calculation will rapidly increases. Therefore, in portable equipment, PAD and so on, since the calculation ability thereof is not necessarily high, there occurs a problem that if the hierarchical clustering algorithm is applied as it is, its performance is deteriorated.

When the user tries to search a particular image data, it often occurs that as its key word, image-capturing locations and/or image-capturing times are remembered. Therefore, it is desirable if it is possible to recognize image data intuitively on a map, and narrow down an object image through a conditional filtering.

Accordingly, it is desirable to provide managing means that is suitable for managing image data visually and narrowing down the image data in view of a filtering condition. The present invention is conceived in view of the above.

An image display apparatus according to a first aspect of the invention includes: image information storage means for storing image information including locations where images are captured as information corresponding to captured image data; cluster managing means for managing the image information with hierarchical clusters including a plurality of clusters configured in a plurality of layers; display layer designation means for designating a layer to be displayed as a display layer among from an uppermost layer through a lowermost layer in the plurality of layers; display condition designation means for designating a display condition of the image data; conditional filtering means for selecting such image data in the display layer that the image information thereof exists within a predetermined range based on the display condition; and drawing means for drawing in the display layer, as an image location display, the image captured locations of the image data, which is selected based on the image information. Accordingly, through displaying the capturing location of the image data as an image location display, such a feature is achieved that only such image data in agreement with the display condition is able to be displayed.

Further, in the first aspect of the invention described above, part of the structure of the clusters having the plurality of layers, i.e., a portion from the uppermost layer to a predetermined layer until the lowermost layer thereof, is able to be fixed. Accordingly, such a feature is achieved that the management of image information corresponding to the image data via the hierarchical cluster is significantly simplified.

Further, the image display apparatus according to the first aspect of the present invention may further include: map storage means for storing maps corresponding to the uppermost layer to the predetermined layer; and map obtaining means for obtaining a map corresponding to the display layer if the map is stored in the map storage means. If the map corresponding thereto is stored in the map storage means, the drawing means draws the map obtained by the map obtaining means together with the image location display superposed thereon. Accordingly, such a feature is achieved that the drawing of the map with the superposed the image location display is allowed if the map corresponding to the layer is stored therein.

Further, in the first aspect of the invention, it may be arranged such that the image information contains an image-capturing time of image data; the display condition contains a range of image-capturing time of image data; and the conditional filtering means selects only such image data based on the display condition that an image-capturing time contained in the image information exists within a predetermined range. Accordingly, such a feature is achieved that image data having the captured times thereof is within the predetermined range is allowed to be displayed.

Further, in the first aspect of the invention, the range of image-capturing times in the display condition may be designated by seasons. Accordingly, instead of specifying particular days and months, condition designation by the seasons is possible, thereby achieving a feature that a more intuitive search is able to be performed by a user.

An image managing apparatus provided according to a second aspect of the present invention includes: image information storage means for storing image information including locations where images are captured as information corresponding to captured image data; cluster managing means for managing the image information with hierarchical clusters including a plurality of clusters configured in a plurality of layers; selection layer designation means for designating a layer to be selected as a selection layer among from an uppermost layer through a lowermost layer in the plurality of layers; selection condition designation means for designating a selection condition of the image data; conditional filtering means for selecting such image data in the selection layer that the image information thereof exists within a predetermined range based on the selection condition; and image data storage means for storing the image data selected on the basis of the image information in the selection layer. Accordingly, in the management of the image data, such a feature is achieved that image data in agreement with the display condition is allowed to be obtained.

Furthermore, according to a third aspect of the present invention, an image display method and a computer program thereof is provided operable in an image display apparatus provided with an image information storage section for storing image information including image-capturing locations and image-capturing times of image data in accordance with a hierarchical cluster including a plurality of clusters each having a plurality of layers. The image display method and the computer program including: designating a layer to be displayed as a display layer among from an uppermost layer to a lowermost layer in the plurality of layers; designating a display condition of image data; selecting such image data that the image information relating thereto exists within a predetermined range based on the display condition in the display layer; and drawing, as an image location display, an image-capturing location of the image data selected based on the image information in the display layer. Accordingly, by displaying the image-capturing location of the image data as an image location display, such a feature is achieved that image data in agreement with the display condition is allowed to be displayed.

According to the present invention, such advantage and effect are achievable that various image data can be managed visually, and image data can be selected efficiently with filtering conditions.

BRIEF DESCRIPTION OF THE DRAWINGS

These and other objects, aspects and embodiments of the present invention will be described in more detail with reference to the following drawings, in which:

FIG. 17 is a table showing details of image-capturing times of image data in FIG. 16;

FIG. 18 is a diagram showing an example of a designation screen for entering filtering conditions according to the embodiment of the invention;

DETAILED DESCRIPTION OF EMBODIMENTS

Embodiments of the present invention will be described more in detail in the following by referring to the accompanying drawings.

Figure 1:
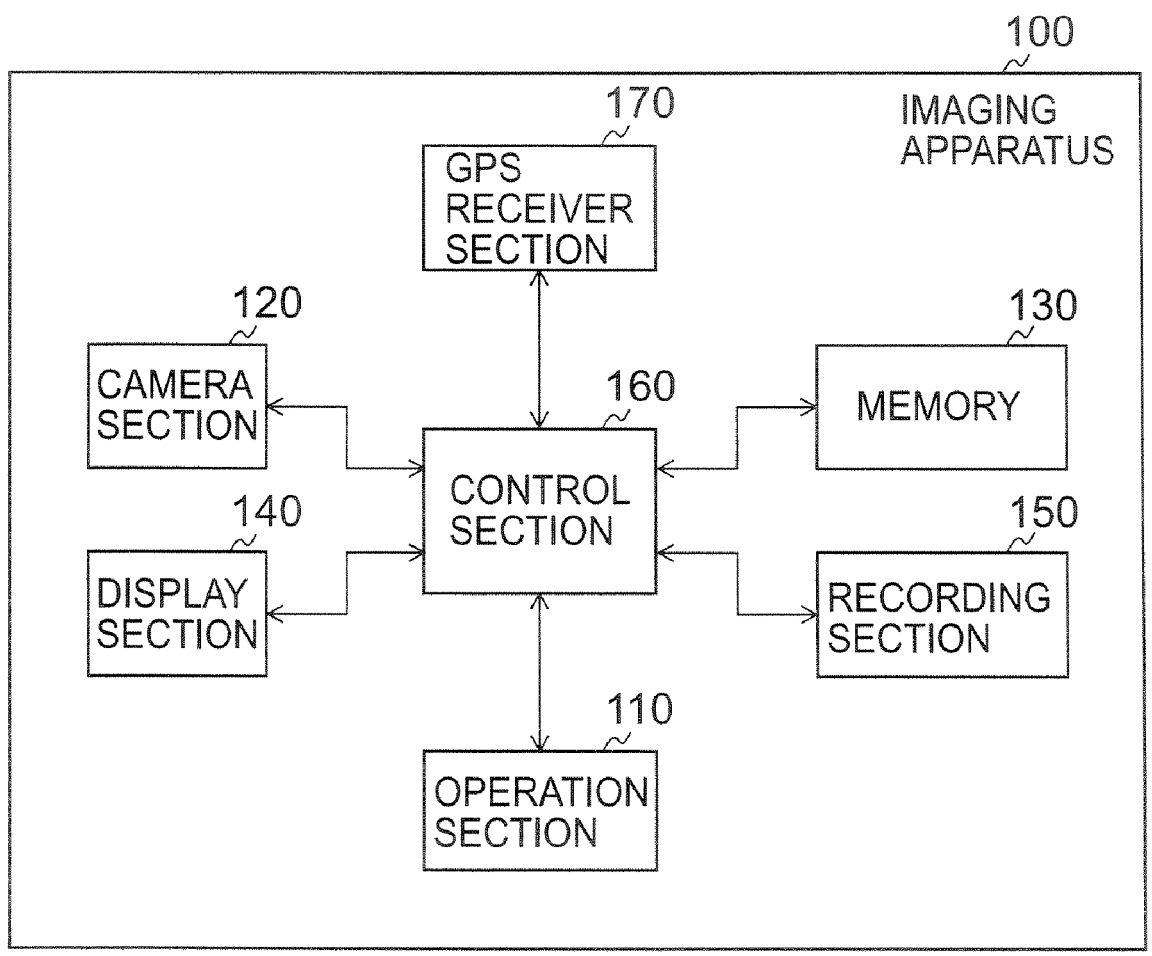
FIG. 1 is a block diagram showing an example of configurations of an imaging apparatus 100 according to an embodiment of the present invention.

FIG. 1 is a block diagram showing an example of configuration of an imaging apparatus 100 according to an embodiment of the present invention. The imaging apparatus 100 includes an operation section 110, a camera section 120, a memory 130, a display section 140, a recording section 150, a control section 160 and a GPS receiver section 170.

The operation section 110 is for accepting entry of operation to be inputted from the user. The operation section 110 can be implemented by use of operation buttons provided on the imaging apparatus 100 and/or as a touch panel integrated with the display section 140.

The camera section 120 is for capturing images of an object, and includes an optical block such as lens, and a signal converter such as a CCD (Charge Coupled Device). Memory 130 is a work area for temporarily retaining video data captured with camera section 120, and volatile memory is generally used therefor.

The display section 140 is for displaying a video being captured or a playback video on a display such as LCD (Liquid Crystal Display). By way of example, this display section 140 may be integrated with the operation section 110 as described above.

The recording section 150 is for recording captured video data and associated information pertaining to the video data, and generally a non-volatile recording medium is used therefor. The control section 160 is for controlling each section in the imaging apparatus 100, and can be implemented with a microcomputer which is programming-controlled.

The GPS receiver section 170 is for receiving radio waves from GPS (Global Positioning System) satellites and acquiring latitude-longitude coordinates (location information) of a current position on the earth. The reception principle is equivalent to the general GPS reception method. The GPS receiver section 170 may be configured to include an antenna for receiving GPS radio waves, a signal converter for converting received radio waves, a computing section for computing location information, a temporary storage for storing a result of computation, and an interface with the control section 160.

Figure 2:
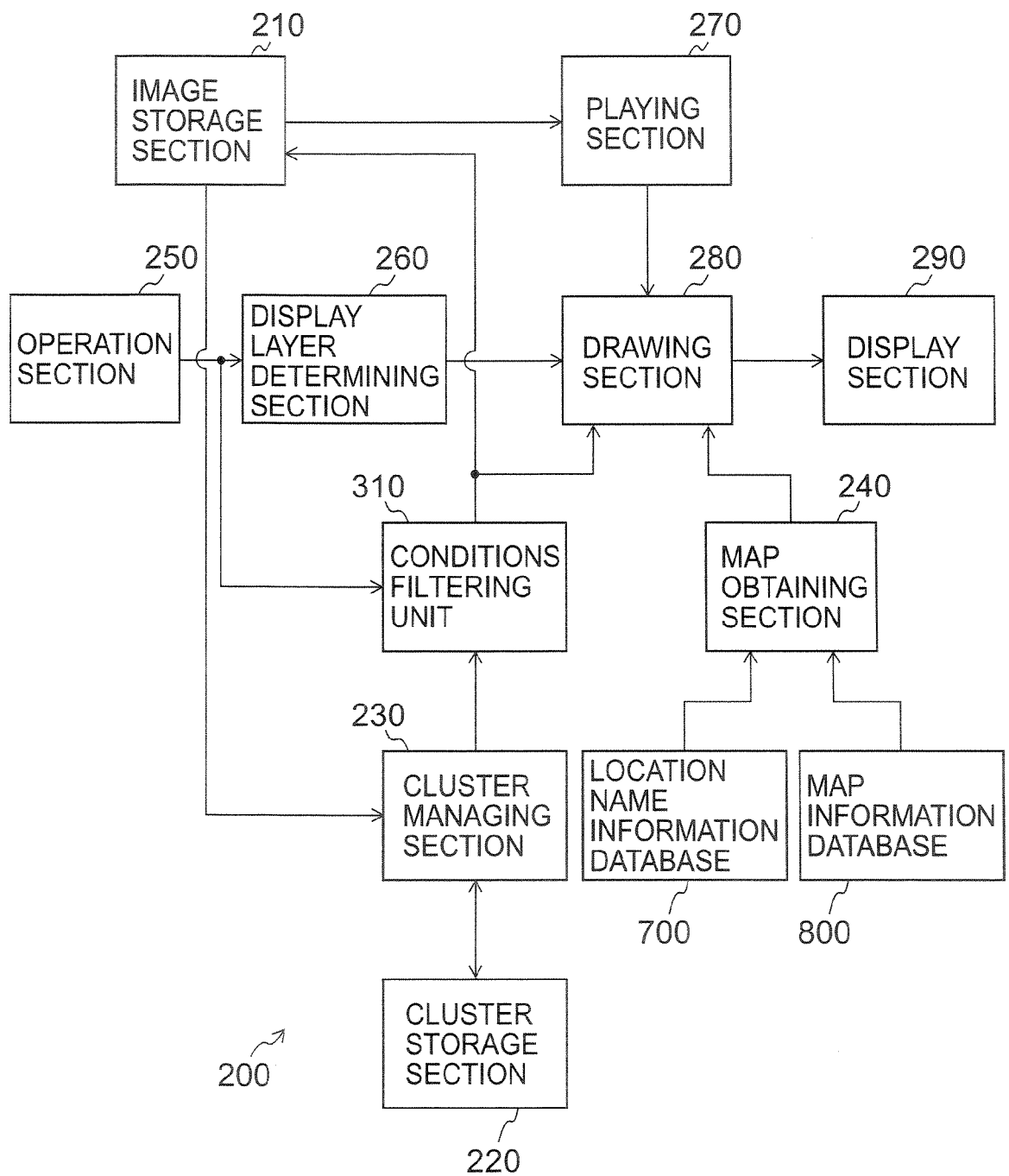
FIG. 2 is a block diagram showing an example of configurations of an image display apparatus 200 according to an embodiment of the invention.

FIG. 2 shows an exemplary configuration of an image display apparatus 200 according to an embodiment of the present invention. The image display apparatus 200 includes an image storage section 210, a cluster storage section 220, a cluster management section 230, a conditional filtering section 235, a place names information database 700, a map information database 800, a map obtaining section 240, an operation section 250, a display layer decision section 260, a reproducing section 270, a drawing section 280, and a display section 290.

By way of example, the image display apparatus 200 may be constructed as a part of the imaging apparatus 100, or as a separate apparatus. In the latter case, image data produced in the imaging apparatus 100 can be considered to be supplied to the image display apparatus 200 via the image storage section 210.

The image storage 210 is for storing image data of captured images. When the image display apparatus 200 is constructed as a part of the imaging apparatus 100, this image storage 210 can be implemented with a built-in memory 130. In the case the image display apparatus 200 is provided as a section separate from the imaging apparatus 100, the image storage 210 can be implemented with a removable recording medium such as a flash memory or the like. Alternatively, it may be arranged so as to store the image data in the image storage 210 via a network.

The cluster storage section 220 is for storing image information corresponding to image data. In order to enable the image information to be managed via a hierarchical cluster, this cluster storage 220 stores a node tree with the structure of a tree, assigning image information corresponding to each end node therein. Accordingly, the image information is managed as belonged to the hierarchical cluster including a plurality of multi-layered clusters.

The cluster managing section 230 is for enabling the image information stored in the cluster storage 220 to be managed via the hierarchical cluster. Details of management to be carried out in the cluster managing section 230 will be described later.

The place names information database 700 is a database for retaining geographic place names information in association with position information based on latitude and longitude. Map information database 800 is a database for retaining map information for drawing a map in association with the position information based on latitude and longitude. The map obtaining section 240 obtains a corresponding map and geographic names information by searching the geographic names information database 700 and the map information database 800.

The operation section 250, likewise the operation section 110, is a section for accepting user entries, and can be implemented as operation buttons provided on image display apparatus 200, and a touch panel integral with the display section 290. Here, in particular, as the operation entries from the user, enlargement or reduction of an image location display indicating an image-capturing location of image data is performed.

The display layer determination section 260 decides a display layer for an image location display in accordance with an enlargement or reduction operation entered from the operation section 250. As will be described later, there are a plurality of layers for the image location display ranging from a layer of the world map to a layer of cities and towns detailed map. The display layer determining section 260 decides which of these layers is to be the display layer.

The reproducing (play) section 270 is for playing image data stored in the image storage 210. The play section 270 is able not only to reproduce the image data itself, but also to supply thumbnail images with reduced size.

The drawing section 280 draws an image-capturing location of image data as an image location display, on the basis of the position information of image information stored in the cluster storage section 220, in the display layer determined by the display layer determining section 260.

Further, when a map corresponding to the display layer is obtained by the map obtaining section 240, the drawing section 280 draws the map overlapping the image location display. At this time, when place names corresponding to the display layer are obtained by the map obtaining section 240, the drawing section 280 draws the place names overlapping the image location display. In other words, the drawing section 280 is provided with an OSD (On-Screen Display) function, and draws the place names obtained from the place names information database 700 overlapping on the map obtained from the map information database 800. Accordingly, a multi-language correspondence of geographical place names is readily achievable.

By way of example, it is effective to determine a font size for use in OSD display according to sizes in the display section 290. Further, since the finer the granularity of place names become, the larger the capacity of memory for storing fonts becomes, it is also effective to determine in advance the granularity of place names in accordance with an expected size of the system's memory capacity.

The display section 290 displays the image location display drawn by the drawing section 280 likewise the display section 140 on a display such as LCD or the like.

The conditional filtering section 235 narrows down (filters) image information corresponding to image data on the basis of a designated condition entered from the operation section 250. For example, when an extent of image-capturing times from a start time to an end time is designated as a filtering condition, image information in agreement with the filtering condition is supplied to the drawing section 280 or to the image storage section 210. In this instance, the drawing section 280 draws the image location display on the basis of the image information supplied thereto. Alternatively, it may be arranged such that by reading out image data corresponding to the supplied image information from the image storage section 210, a duplicate thereof is copied in another recording medium or in the image storage section 210.

Figure 3:
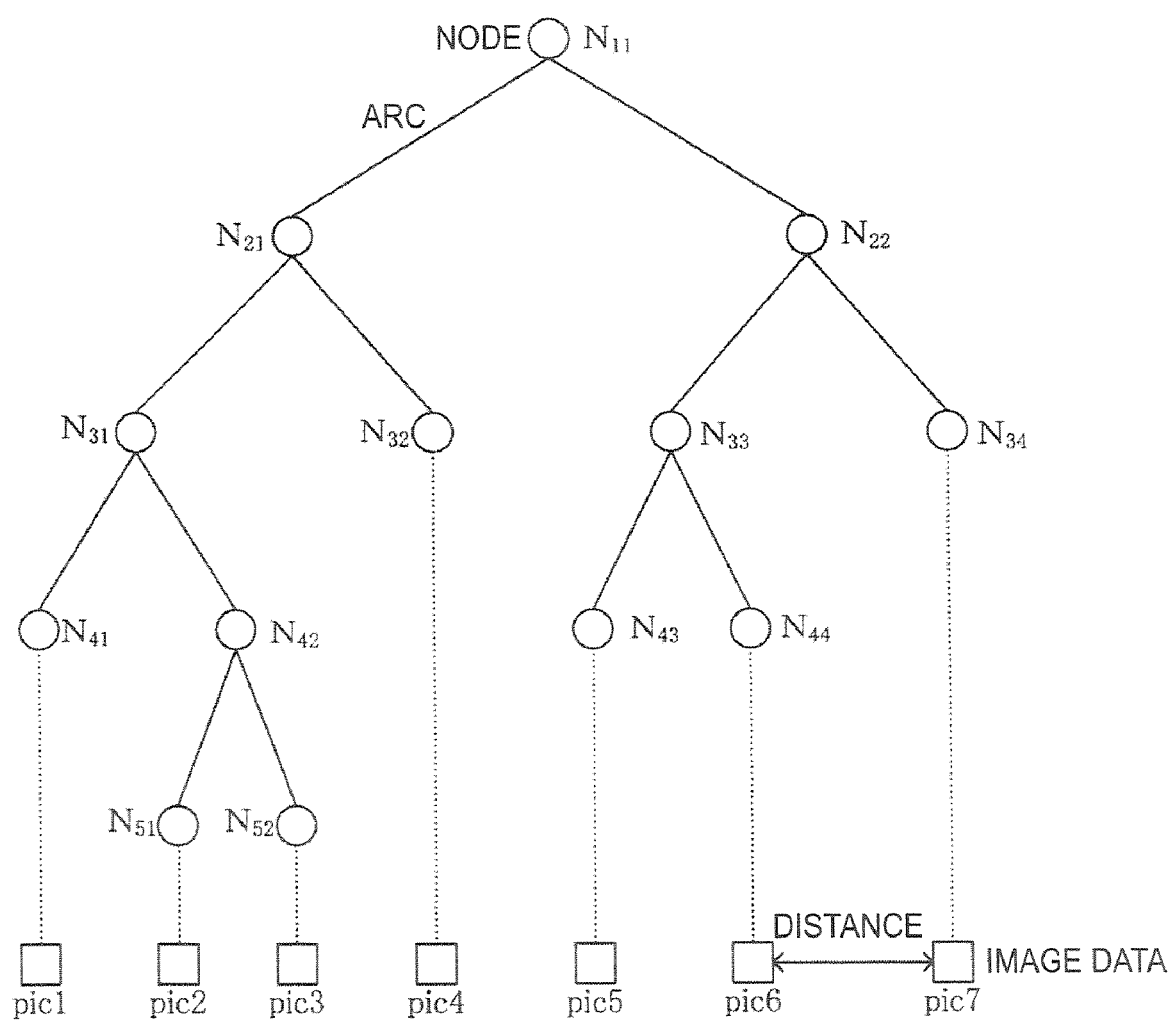
FIG. 3 is a diagram showing an example of a cluster tree according to an embodiment of the invention.

FIG. 3 is a diagram showing an example of a cluster tree according to an embodiment of the present invention. In this example, a data structure with a treelike branching is adopted, in which between nodes are connected hierarchically with arc. Between nodes connected with arc, the upper node is called a parent node, and the lower node is called a child node. Further, among the child nodes, the left-side node is called a left node, and the right-side node is called a right node.

Further, in this cluster tree, the uppermost node which is not connected to a parent node is called a root node, and a node which does not connect a child node is called a leaf node or an end node.

In this example, as a left node to a root node $N_{11}$, a node $N_{21}$ is connected, and as a right node thereto, a node $N_{22}$ is connected, respectively. Further, as a left node to node $N_{21}$, a node $N_{31}$ is connected and as a right node thereto, a node $N_{32}$ is connected, respectively. Further, as a left node to node $N_{22}$, a node $N_{33}$ is connected, and as a right node thereto, a node $N_{34}$ is connected, respectively. Still further, as a left node to node $N_{31}$, a node $N_{41}$ is connected, and as a right node thereto, a node $N_{42}$ is connected, respectively. Alternately, as a left node to node $N_{33}$, a node $N_{43}$ is connected, and as a right node thereto, a node $N_{44}$ is connected, respectively. Furthermore, as a left node to node $N_{42}$, a node $N_{51}$ is connected, and as a right node thereto, a node $N_{52}$ is connected, respectively.

Here, all of the $N_{41}$, node $N_{51}$, node $N_{52}$, node $N_{32}$, node $N_{43}$, node $N_4$4, and node $N_{34}$ are an end node, which corresponds to image data pic1 through pic7, respectively. In this cluster tree, image data pic1 through pic7 are managed via a hierarchical cluster in such a manner as will be described in the following.

Figure 4:
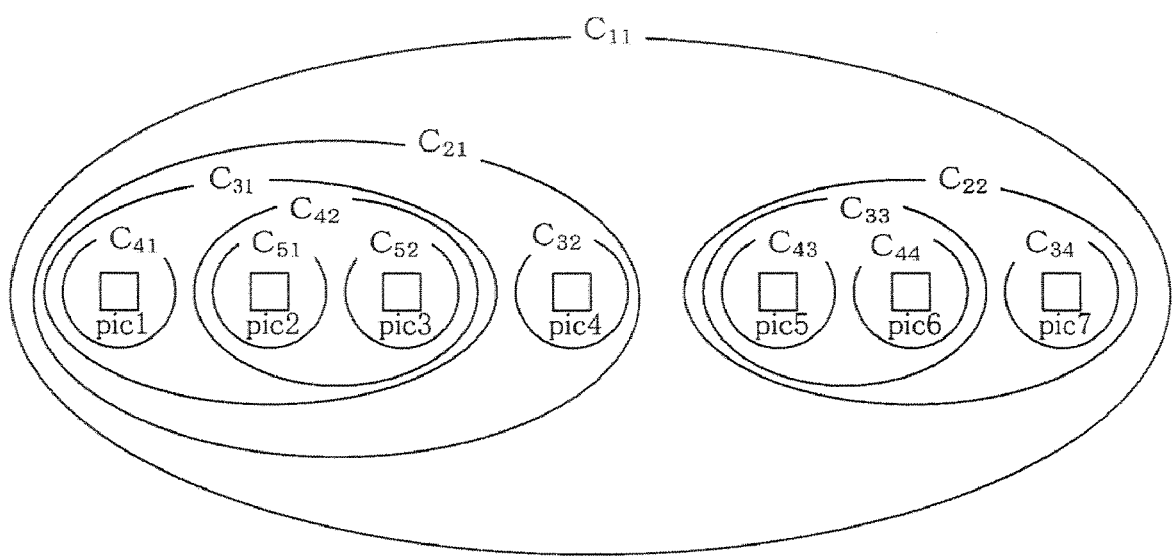
FIG. 4 is a diagram showing an example of a hierarchical cluster embodying the invention.

FIG. 4 is a schematic diagram showing an example of a hierarchical cluster according to an embodiment of the present invention. This example shows a hierarchical cluster that is realized by means of the cluster tree shown in FIG. 2, where all the image data pic1 through pic7 are contained within a cluster $C_{11}$ which is an uppermost layer. In this hierarchical cluster, the cluster $C_{11}$ contains cluster $C_{21}$ and cluster $C_{22}$. The cluster $C_{21}$ contains cluster $C_{31}$ and cluster $C_{32}$. And, the cluster $C_{22}$ contains cluster $C_{33}$ and cluster $C_{34}$. Further, the cluster $C_{31}$ contains cluster $C_{41}$ and cluster $C_{42}$, then, the cluster $C_{33}$ contains cluster $C_{43}$ and cluster $C_{44}$. Still more, the cluster $C_{42}$ contains cluster $C_{51}$ and $C_{52}$.

Here, it is noted that the clusters $C_{41}$, $C_{51}$, $C_{52}$, $C_{32}$, $C_{43}$, $C_{44}$ and $C_{34}$ do not contain any more cluster therein, and each of which corresponds to the image data pic1 through pic7, respectively. Accordingly, the image data pic1 through pic7 are arranged to be managed respectively via the hierarchical cluster. For example, image data pic2 is arranged to be contained sequentially from the above in the cluster $C_{11}$ which is the uppermost layer, cluster $C_{21}$, cluster $C_{31}$, cluster $C_{42}$ and cluster $C_{51}$, and is subjected to their management.

According to this hierarchical cluster, pairs of image data having a yardstick of a relatively closer distance are allowed to be contained in the same cluster. Here, as its yardstick of distance, for example, position information based on latitude and longitude pertaining to an image-capturing location of image data is used. Accordingly, a data management is enabled so that a set of image data having relatively closer image-capturing locations are contained in the same cluster, and that when adding a new image data, it is arranged at a suitable position in the hierarchical cluster.

FIG. 5 is a schematic diagram showing an example how a new cluster is added to the hierarchical cluster according to an embodiment of the invention. Here, as a most simple example, an initial state is supposed where two image data pic1 and pic2 are already stored In other words, as shown in FIG. 5A, as child nodes to a node N3, there are supposed to exist a left node N1 which corresponds to image data pic1 and a right node $N_2$ which corresponds to image data pic2.

Figure 5A:
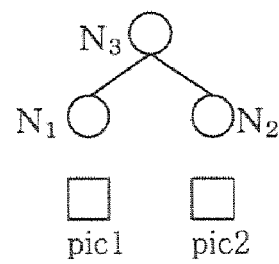
FIG. 5 is a diagram showing an example how a new cluster is added to the hierarchical cluster according to the embodiment of the invention.
Figure 5B:
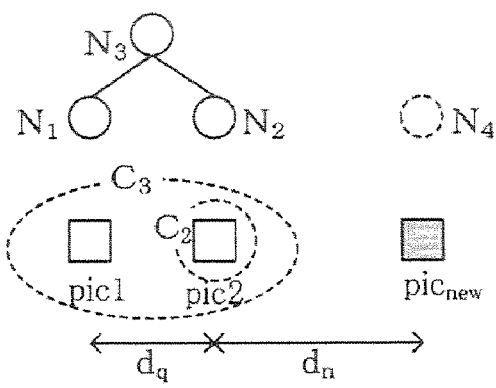

In the case as shown in FIG. 5B, where a new focus node $N_4$, which is a subject of current interest and corresponds to a new image data "$pic_{new}$", is to be added to the cluster, a position of the new image data $pic_{new}$ will be detected as follows. In the cluster, image data pic1 and pic2 are already clustered. The new image data $pic_{new}$ are examined, for example, in the sequential order of the days and times at which their images were captured.

Cluster $C_3$, which is the largest cluster in the neighborhoods of the new image data $pic_{new}$, and to which the proximal image data having the shortest distance to the new image data $pic_{new}$ belongs, becomes a candidate cluster to which the new image data $pic_{new}$ may belong. Here, the proximal image data refers to such image data that is nearest, for example, in the sequential order of image-capturing times and days. And, in this example, it corresponds to the image data pic2.

Subsequently, a distance $d_n$ (additional distance) between the new image data $pic_{new}$ and the proximal image data is obtained, and at the same time, a value of the maximum $d_q$ (maximum distance) between proximal image data belonging to the candidate cluster $C_3$ is obtained. In this example, the maximum distance $d_q$ corresponds to a distance between image data pic1 and pic2.

Figure 5C:
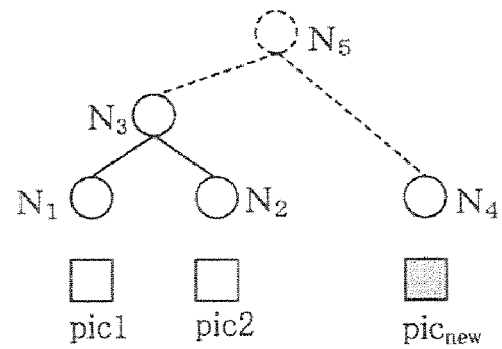

In the case of FIG. 5B where an additional distance $d_n$ is longer than the maximum distance $d_q$, the image data belonging to the candidate cluster $C_3$ are maintained as they are, then as shown in FIG. 5C, a new node $N_5$ is added to a position above the node $N_3$ that constitutes the candidate cluster $C_3$. And, with this node $N_5$ having as a parent node, the focus node $N_4$ of the current interest is added thereto as a child node.

Figure 5D:
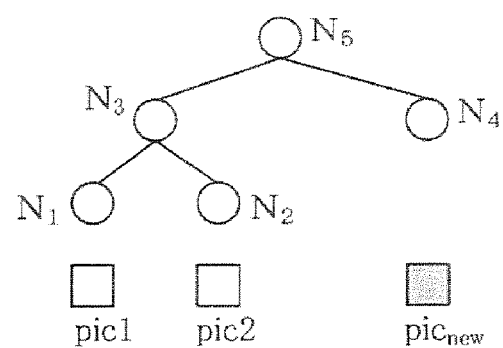

Accordingly, as shown in FIG. 5D, a new cluster tree is finally formed having the focus node $N_4$ of the current interest corresponding to the new image data $pic_{new}$ newly added thereto. This means that a distance between image data pic1 and pic2 is relatively closer than a distance from the image data $pic_{new}$.

FIG. 6 is a schematic diagram showing another example illustrating how a new cluster is added to the hierarchical cluster according to an embodiment of the present invention. Here, likewise the example of FIG. 5, as a simplest example, an initial state is supposed where two image data pic1 and pic2 are already stored.

Figure 6A:
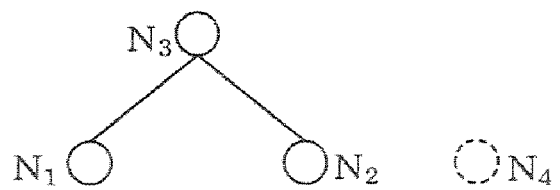
FIG. 6 is a diagram showing another example how a new cluster is added to the hierarchical cluster according to the embodiment of the invention.
Figure 6A:
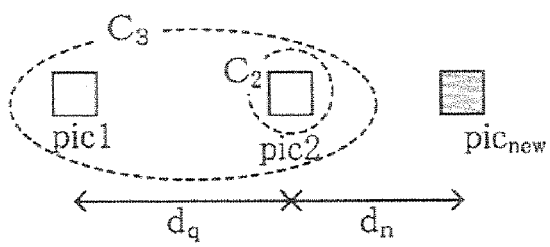
Figure 6B:
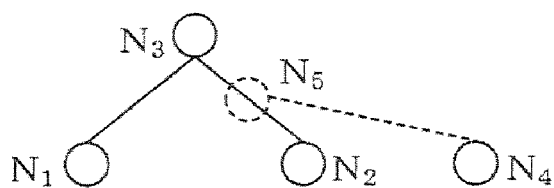
Figure 6B:
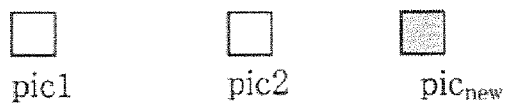

As a result of computations of an adding distance $d_n$ and a maximum distance $d_q$, if the adding distance $d_n$ is shorter than the maximum distance $d_q$ as shown in FIG. 6A, a new cluster is formed so that the new image data $pic_{new}$ is contained in the same cluster as the proximal image data pic2. In other words, as shown in FIG. 6B, a new node $N_5$ is formed and inserted between the node $N_3$ constituting a candidate cluster $C_3$ and the node $N_2$ corresponding to the proximal image data pic2. Then, with this node $N_5$ having as a parent node, a focus node $N_4$ of the current interest is added thereto as a child node.

Figure 6C:
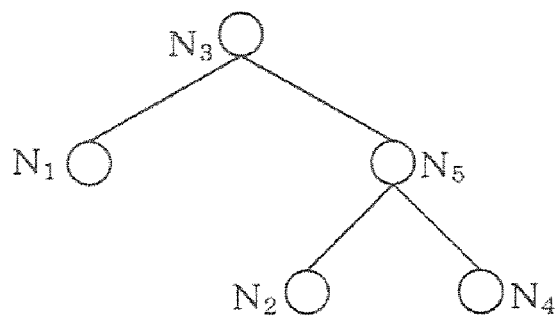
Figure 6C:
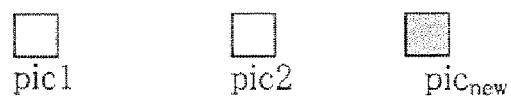

Accordingly, as shown in FIG. 6C, a new cluster tree with addition of the focus node $N_4$ of the current interest corresponding to the new image data $pic_{new}$ is finally formed. This means that the distance between the image data $pic_{new}$ and pic2 is relatively closer than a distance between the image data pic1 and pic2.

Figure 7:
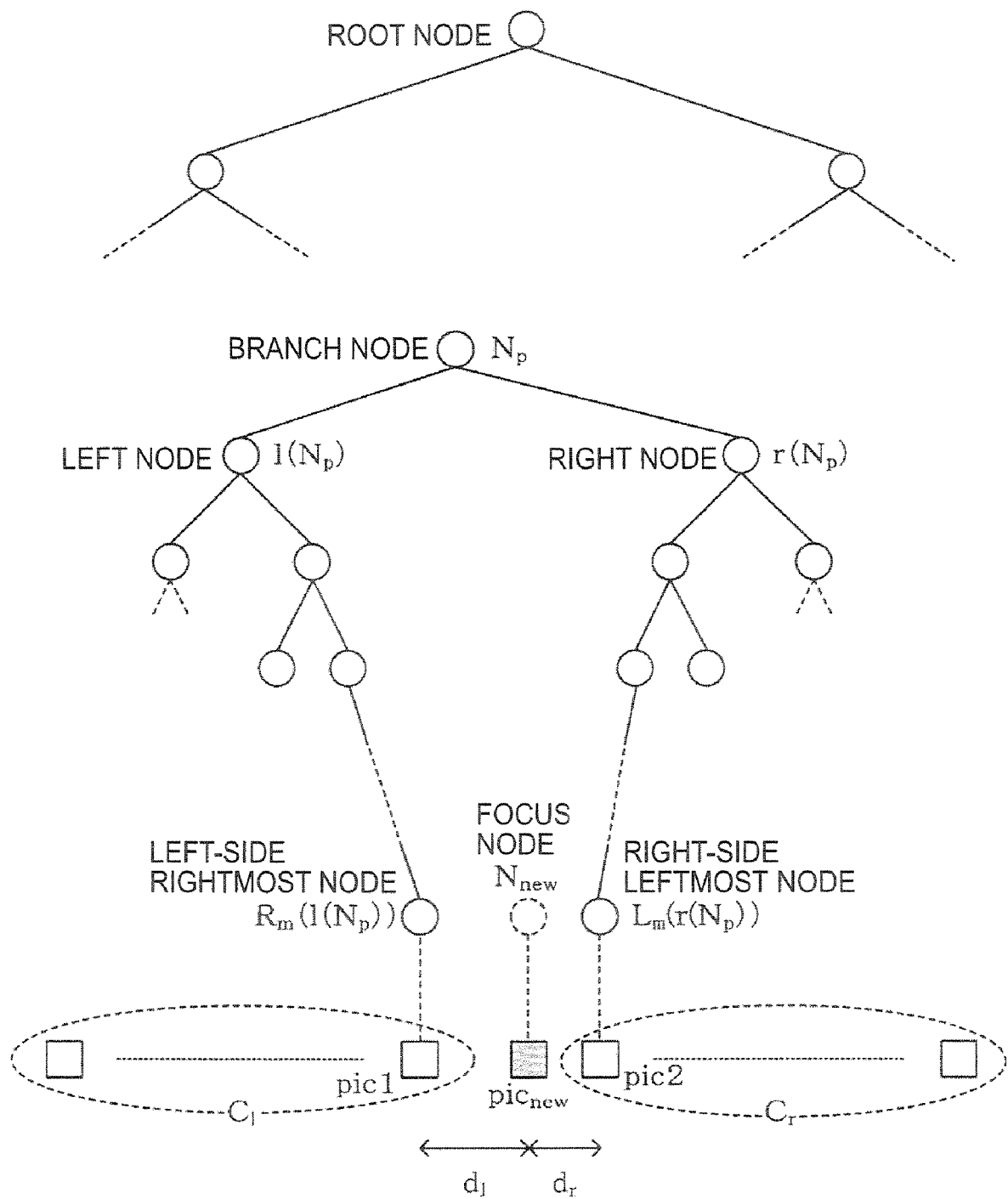
FIG. 7 is a diagram showing an example in general how a new cluster is added to the hierarchical cluster according to the embodiment of the invention.

FIG. 7 is a schematic diagram showing a typical example illustrating addition of a new cluster to a hierarchical cluster according to the embodiment of the present invention. Here, such a state is supposed where nodes in layers lower than a root node are set as a branching node $N_p$. A left-side node of a branching node $N_p$ is labeled as a "$l(N_p)$", and a right-side node thereof is labeled as an "$r(N_p)$".

For example, in the sequential order of image-capturing days and times, a branching node $N_p$ has, as a child node, either nodes corresponding to a largest cluster adjacent to a new image data $pic_{new}$ on the left side or on the right side thereof. Accordingly, the largest cluster adjacent to the new image data $pic_{new}$ on the left side is called a cluster $C1$ which corresponds to a left node 1 ($N_p$) of the branching node $N_p$, while the largest cluster adjacent to the new image data $pic_{new}$ on the right side thereof is called a cluster $C_r$ which corresponds to a right node r ($N_p$) of the branching node $N_p$.

Further, if a leaf node disposed at the rightmost position among plural nodes contained within a certain node N in a cluster tree is labeled "$R_m$ (N)", and a leaf node disposed at the leftmost position is labeled "$L_m$ (N)", a leaf node disposed at the rightmost position among nodes contained within a left node 1 ($N_p$) under the branching node $N_p$ (=a left side right end node) can be labeled as "$R_m$ ($l(N_p)$)", and a leaf node disposed at the leftmost position among nodes contained in a right node r ($N_p$) under the branching node $N_p$ (=a right side left end node) can be labeled as "$L_m(r(N_p))$"

A distance $d_1$ between a new image data $pic_{new}$ and an image data pic1 which corresponds to a left side right end node $R_m(l(N_p))$ as well as a distance $d_r$ between the new image data $pic_{new}$ and an image data pic2 which corresponds to a right side left end node $L_m(r(N_p))$ are calculated and compared. As a result of comparison, if the distance dr is shorter than $d_1$, a right node $r(N_p)$ under the branching node $N_p$ is nominated as a candidate node $N_q$, and if the distance $d_1$ is shorter, a left node $l(N_p)$ under the branching node $N_p$ is nominated as a candidate node $N_q$.

Then, with this candidate node $N_q$ as an object, an additional distance $d_n$ and the maximum distance $d_q$ are calculated. As a result, if the maximum distance $d_q$ is shorter than the additional distance $d_n$, a node $N_{in}$ is inserted between the branching node $N_p$ and the candidate node $N_q$. A child node having this node $N_{in}$ as a parent node is disposed as a focus node $N_{new}$ of the current interest. On the other hand, if the additional distance $d_n$ is shorter than the maximum distance $d_q$, in order to search through still lower layers, the candidate node $N_q$ is set as a new branching node $N_p$, and a candidate node $N_q$ on either side which is closer to the focus node $N_{new}$ of the current interest is set as a new candidate node $N_q$, then, the above-mentioned processing for comparing between the additional distance $d_n$ and the maximum distance $d_q$ is again carried out recursively.

In this manner, the focus node $N_{new}$ of the current interest is finally disposed. However, if such recursive processing has to be carried out for the whole layers from the uppermost layer to the last layer, there occurs a problem that a quantity of computation needed therefor becomes enormous. Therefore, according to the embodiment of the present invention, it is arranged so that, by fixing some of predetermined upper layers in a hierarchical cluster as described, a new node is allowed to be added only to the lower layers.

Figure 8:
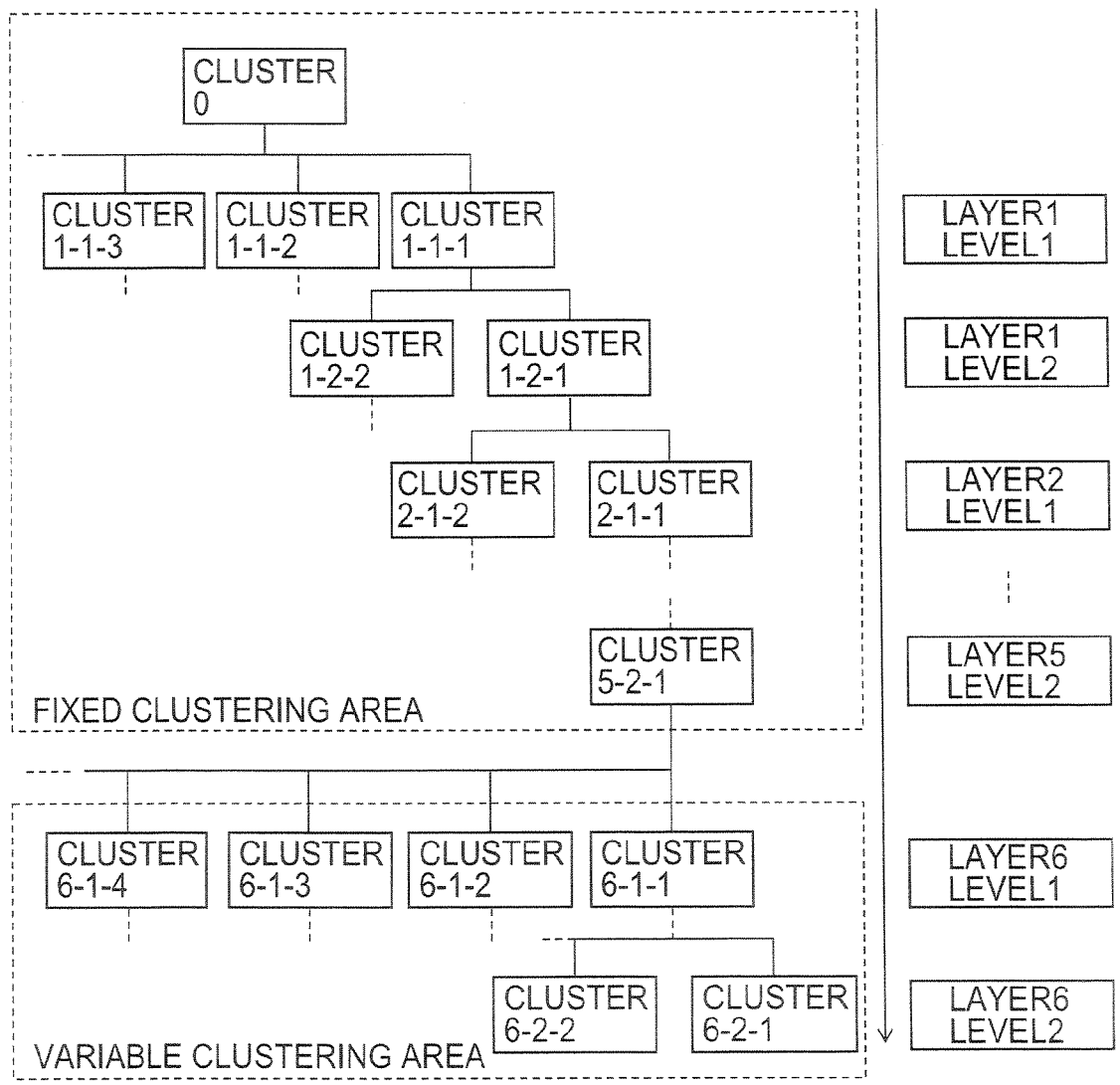
FIG. 8 is a diagram showing an example of structures of hierarchical clusters according to the embodiment of the invention.

FIG. 8 is a block diagram showing an example of a hierarchical cluster structure according to an embodiment of the present invention. Here, six layers each having two levels are supposed to exist, namely, there are arranged hierarchically, sequentially from level 1 of layer 1, level 2 of layer 1, level 1 of layer 2 . . . level 2 of layer 5, level 1 of layer 6 and level 2 of layer 6. In other words, the hierarchical cluster structure has a total of 13 layers including cluster 0 of the uppermost layer.

In the same layer, level 1 is higher than level 2 in the hierarchy. Namely, in a state while displaying a world map of level 1 of layer 1, when an enlarge operation is entered, its display is enlarged so as to display a world map of level 2 of layer 1. On the other hand, in a state of displaying the world map of level 2 of layer 1, when a reduce operation is entered, its display is reduced so as to display the world map of level 1 of layer 1. At this time, after entry of the enlarge operation at level 1, the map remains as an underlayer to be used as it is, however, the display is enlarged to show more detailed contents. To the contrary, after entry of a reduce operation at level 2, although the map remains as an underlayer to be used as it is, its display content is reduced to show more rough and abstracted contents.

In this hierarchical cluster structure, a portion from level 1 of layer 1 through level 2 of layer 5 is fixed as a fixed cluster, and any modification of the structure of the fixed cluster is not allowed. Namely, a new image data is allowed to be added only to level 1 in layer 6 or level 2 in layer 6. Therefore, as described above with reference to FIG. 7, when inserting a focus node of current interest, an initial value of a branching node is set in the uppermost layer in layer 6, and with this as a starting point, layers are traced down in the lower direction so as to determine an appropriate position of the node insertion.

Although it is described by way of example of a multi-branched cluster tree, it is essentially the same as the two-branched cluster tree in FIG. 3. In actual implementation, each cluster can be implemented with a more increased number of hierarchical clusters.

By supposing such a hierarchical cluster in which a portion thereof is fixed, an insertion of a new node, i.e., an addition of a new image data becomes substantially easy, thereby facilitating a high speed processing to be attained in the cluster management.

Figure 9:
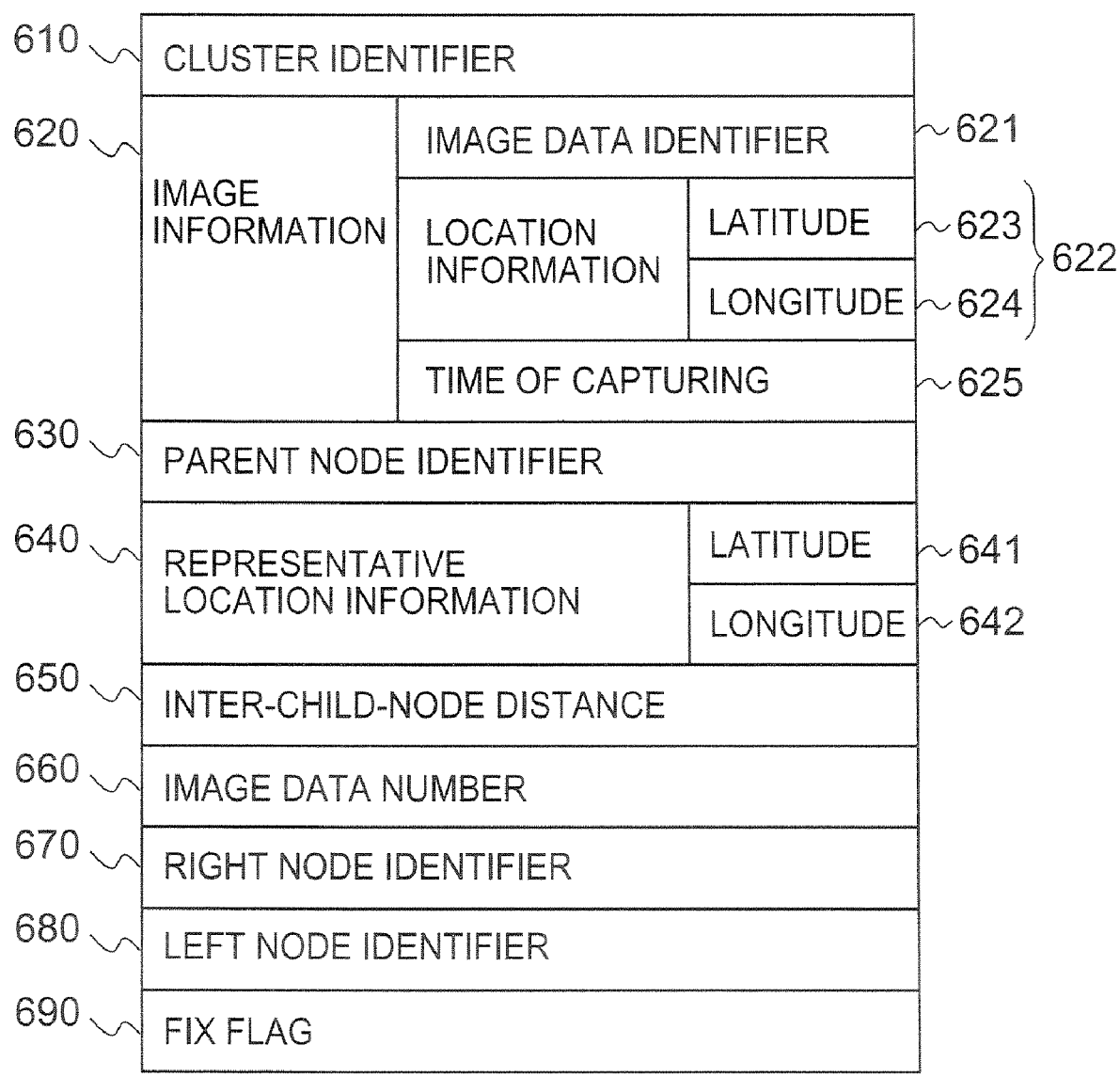
FIG. 9 is a diagram showing an example of data structure of each node in the hierarchical cluster according to the embodiment of the invention.

FIG. 9 is a diagram showing an example of data structure at each node in a hierarchical cluster according to an embodiment of the present invention. In this data structure, there are contained a cluster identifier 610, image information 620, a parent node identifier 630, representative place information 640, an inter-child node distance 650, the number of image data 660, a right node identifier 670, a left node identifier 680, and a fixing flag 690.

The cluster identifier 610 is an identifier for uniquely identifying a cluster corresponding to a subject node. The image information 620 retains information associated with a corresponding image data when a subject node is an end node, including an image data identifier 621, a location information 622 and an image capturing time 625. Here, the image data identifier 621 is an identifier for uniquely identifying image data stored in the image storage 210, and for this purpose, for example, a file name or the like may be used. Further, the location information 622 indicates latitude 623 and longitude 624 of an image capturing location of the image data.

Further, image-capturing time 625 indicates the time at which the image data was captured. When an image-capturing time is designated as a filtering condition via the operation section 250, the conditional filtering section 235 is able to perform filtering by use of this designated image-capturing time 625. Alternatively, in place of this image-capturing time 625, a time stamp in a file system of the image data stored in the image recording section 210 or GPS's meta data may be used.

The parent node identifier 630 indicates a cluster identifier 610 corresponding to a parent node of the subject node. Representative place information 640 shows place information representing a cluster corresponding to the subject node, and is used appropriately in accordance with an application. For example, when displaying the location display of an image data at a specific position on a map, this representative place information 640 may be used therefor.

The inter-child distance 650 indicates a distance between two child nodes of a subject node. The number of image data 660 indicates the number of image data contained in a cluster corresponding to the subject node.

The right node identifier 670 indicates a cluster identifier 610 of a cluster corresponding to a child node on the right side of a subject node, and left node identifier 680 indicates a cluster identifier 610 of a cluster corresponding to a child node on the left side of the subject node.

The fixing flag 690 indicates an attribute whether or not the structure of a cluster corresponding to a subject node is fixed. As described above, according to the embodiment of the invention, the cluster structure is partly fixed from the top down to level 2 of layer 5, leaving the other parts of the cluster structure in the lower layers variable. However, although at first its cluster structure was set variable there may arise such an occasion that when a certain condition was met, the structure thereof is desired to be fixed. For example, when the number of image data belonging to a specific cluster exceeds a predetermined number, and if successive addition of image data continues, the cluster structure will become unbalanced. In such instance, it is useful to fix the specific cluster. Therefore, even in a cluster the structure thereof is set variable at first, the cluster structure thereof is able to be fixed by setting up this fixing flag 690 indicating a fixing attribute.

Figure 10:
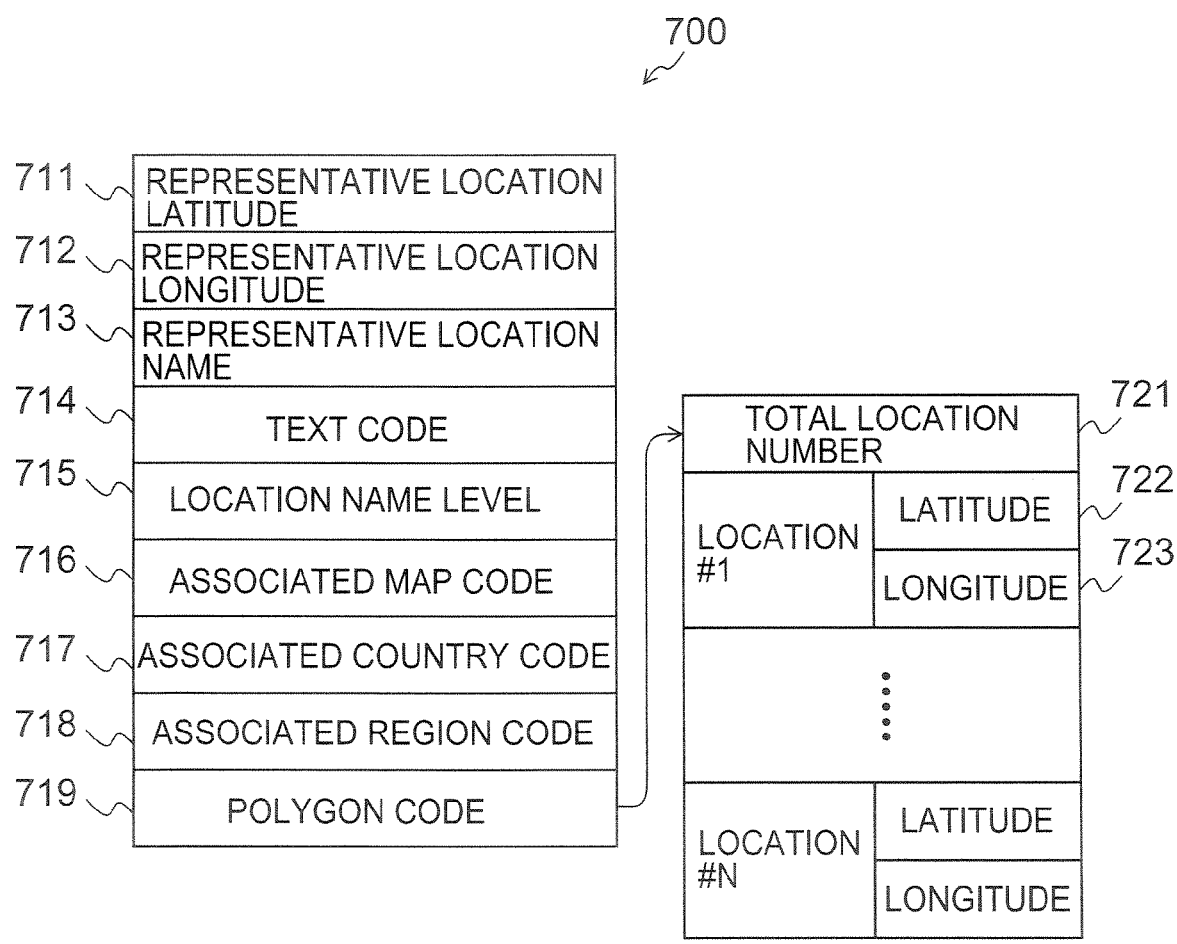
FIG. 10 is a diagram showing an example of data structures of a place names information database 700 according to the embodiment of the invention.

FIG. 10 is a diagram showing an example of data structure of a place names information database 700 according to an embodiment of the invention. The place names information database 700 retains place names information per district, more specifically, it retains representative place's latitude 711 and longitude 712, representative place name 713, character code 714, place name level 715, assigned map code 716, assigned country code 717, assigned district code 718, and polygon code 719.

The representative place latitude 711 and its longitude 712 show latitude and longitude of a representative place in the region. Representative place name 713 shows the name of a representative place in the region. Character code 714 indicates a character code of the representative place name 713 (for example, shift JIS code, etc.). The character code 714 is used for corresponding to multi languages. Place name level 715 indicates, as a level of representative place name 713, a degree of details such as metropolis/municipal/prefecture levels, city/town/village levels, area within village, or the like.

The assigned map code 716 indicates a code of a map to which a subject region belongs. The assigned country code 717 indicates a code of a country to which the subject region belongs. The assigned district code 718 indicates a code of a district to which the subject region belongs.

The polygon code 719 indicates a link to a polygon group which defines the subject region. The polygon group is formed with N positions (N is integer). Each position is defined by latitude 722 and longitude 723. In a block 721 indicative of a total number of positions, the number of (N) positions is indicated.

The place names information database 700 determines a corresponding region by comparing the latitude and longitude given from the map obtaining section 240 with the latitude 722 and longitude 723 at each location, and supplies place name information of the corresponding region to the map obtaining section 240.

Figure 11:
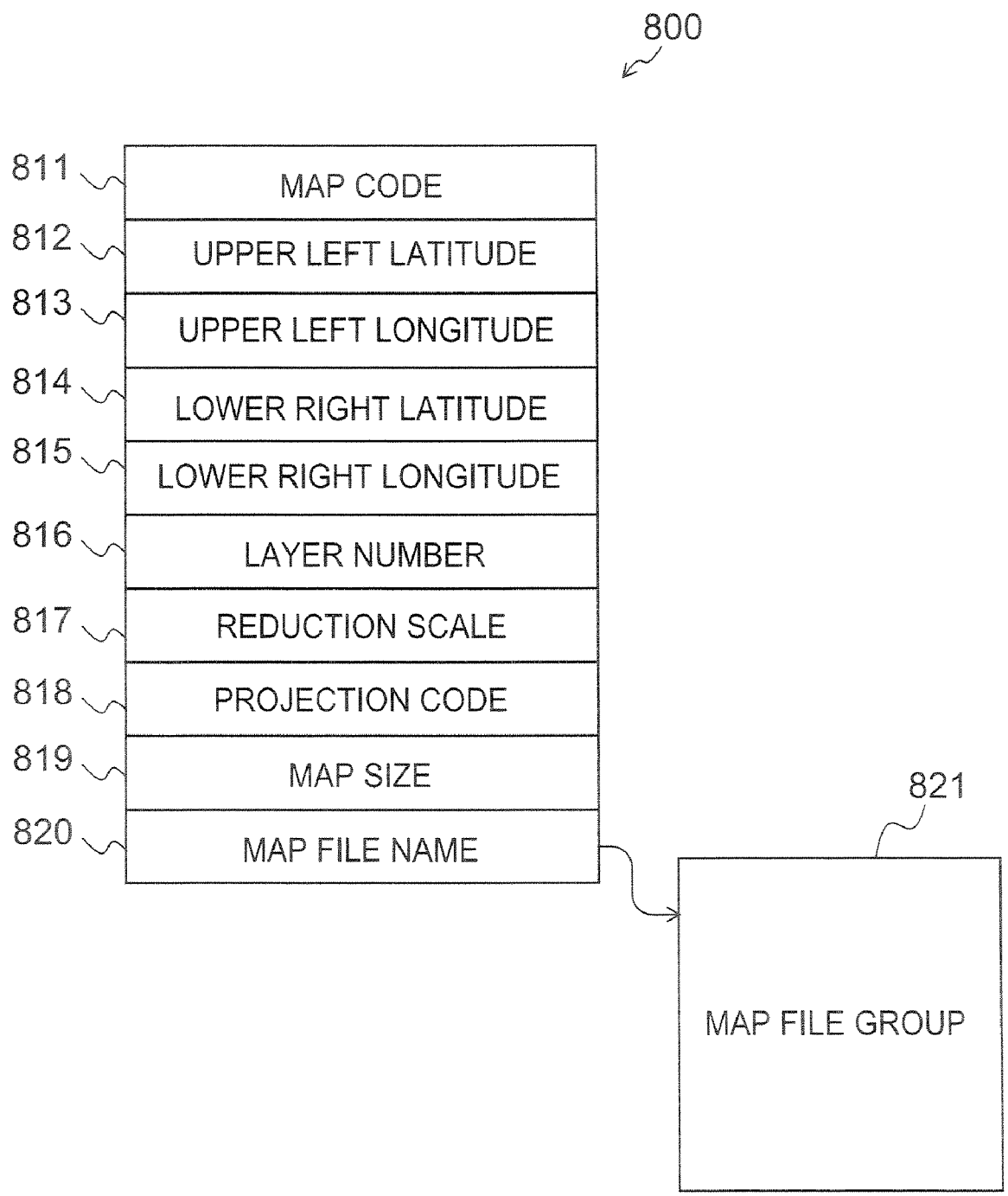
FIG. 11 is a diagram showing an example of data structures of a map information database 800 according to the embodiment of the invention.

FIG. 11 is a diagram showing an example of data structure of a map information database 800 according to an embodiment of the invention. As map information, this map information database 800 has a map code 811, upper left point's latitude 812, upper left point's longitude 813, bottom right point's latitude 814, bottom right point's longitude 815, layer number 816, scaling 817, drawing method code 818, map size 819, and a map file name 820.

Further, the map information database 800 includes a map file group 821 storing map contents. Here, for example, if a raster scan map is considered, a map in a GIF (Graphic Interchange Format) will be retained as a map file. A GIF format file which is small in size and has a good image quality in contours is suitable for a simplified map with a plenty of lines.

In the map information, map code 811 designates a code for uniquely identifying a corresponding map. The upper left angle latitude 812 and the upper left angle longitude 813 indicate respective latitude and longitude at the upper left angle of a corresponding map. Further, bottom right angle latitude 814 and bottom right angle longitude 815 indicate respective latitude and longitude at the bottom right angle of a corresponding map. By indicating respective latitudes and longitudes at the upper left angle and the bottom right angle, it becomes possible to determine whether or not objective latitudes and longitudes are included in the subject map.

The layer number 816 indicates a layer of maps described with reference to FIG. 8. Scale 817 indicates a degree of enlarge/reduce scale of a subject map. Drawing method code 818 indicates a code for identifying s drawing method of the subject map. By way of example, as the drawing method, there are, for example, Mercator's projection, azimuthal equidistance projection or the like. The drawing section 280 in FIG. 2 specifies a particular drawing method from this draw method code 818, performs coordinate conversion and executes drawing thereof.

The map size 819 indicates a size of the map, for example, by the number of pixels. Map file name 820 indicates a file name by which to specify a subject map in the map file set 821.

Figure 12:
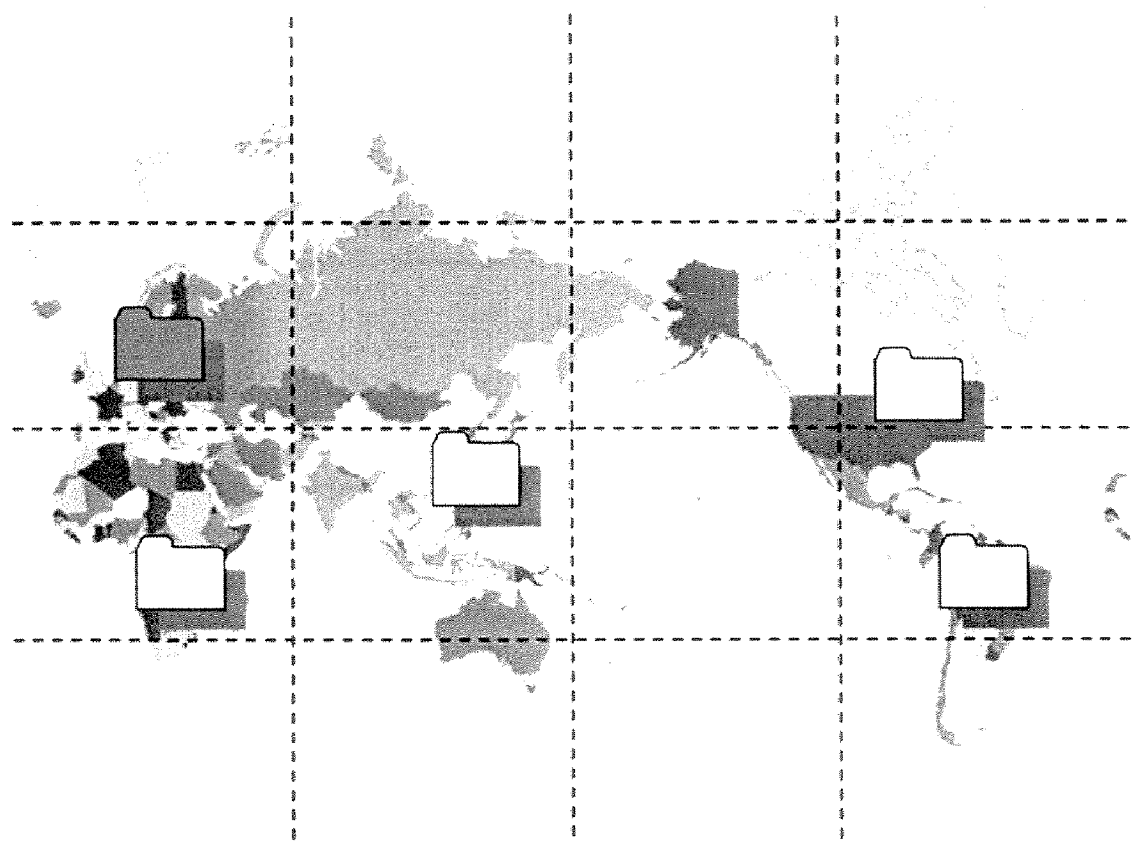
FIG. 12 is a diagram showing an example of a world map in the uppermost layer according to the embodiment of the invention.

FIG. 12 shows an example of a world map in the uppermost layer according to an embodiment of the present invention. The world map is a map corresponding to the layer 1. According to an embodiment of the present invention, since a fixed cluster structure is supposed in the upper layers, a display position of the image location display which indicates an image-capturing location of the image data is also displayed at a fixed specific position.

The world map is partitioned into meshes having a total of 16 divisions; four vertical divisions and four horizontal divisions, then, on the basis of these meshes, a fixed cluster is formed. If an image data exists within the range of a certain mesh, a symbol is drawn at a specific position in a certain mesh. As the symbol in this instance, for example, a folder icon or the like may be drawn.

In other words, in this world map, it is shown not at an exact position that precisely reflects the latitude and longitude of the image data but at a rough position merely teaching which of the 16 divisions it exists. For example, in an example of FIG. 12, in whichever region of Tokyo, the northern part of Australia or India, the image may have been captured, a folder icon is indicated in the southern part of Japan as representing the mesh that contains the above-mentioned regions. Such fixed display may be used not only in the world map of the uppermost layer, but also in the lower layers. Accordingly, such an image data management on the basis of the fixed clusters described above can be achieved easily.

FIG. 13 shows examples of maps in respective layers according to an embodiment of the present invention. A world map in layer 1 of FIG. 13A is the map in the uppermost layer described with reference to FIG. 12, and where the whole part of the world is displayed.

Figure 13A:
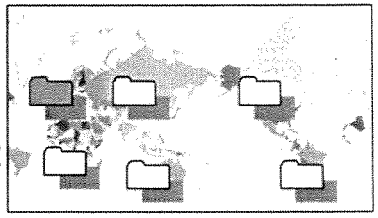
FIG. 13 is a diagram showing examples of maps in respective layers according to the embodiment of the invention.
Figure 13B:
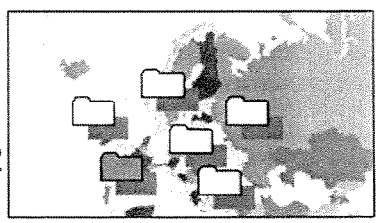
Figure 13C:
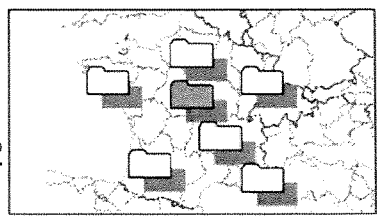
Figure 13D:
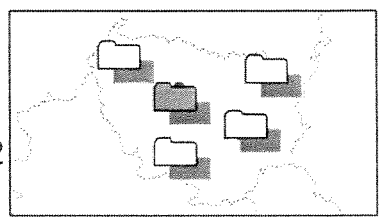
Figure 13E:
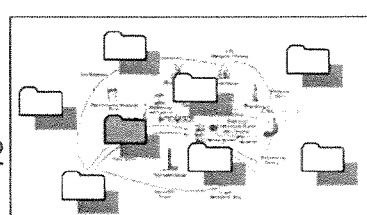

As lower layers of the world map of layer 1, there are provided sequentially a world regional map of layer 2 shown in FIG. 13B, a country map of layer 3 shown in FIG. 13C, a district map of layer 4 shown in FIG. 13D, and a city outline map of layer 5 shown in FIG. 13E. In these maps, it is also possible to readily implement the image data management on the basis of fixed clusters by performing the fixed display described above.

Figure 13F:
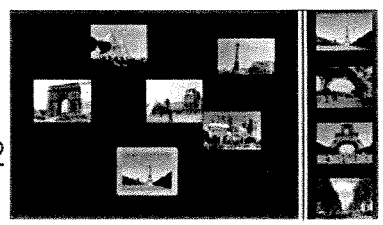

FIG. 13F is a detailed city map, however, an underlying map is not shown. In the case where no corresponding map exists in the map information database 800, underlying maps cannot be displayed as in this case. In such a case, a thumbnail image is displayed at a relative position on the basis of location information of the image data. Accordingly, even in such a case where underlying map cannot be displayed, the image-capturing location of the image data can be indicated relatively.

Each map from layer 1 through layer 6 shifts in response to an input operation from the user. When an enlargement operation is entered while displaying the world map of layer 1, its display is enlarged to show a world regional map of layer 2. When a further enlargement operation is entered, its display is further enlarged to show a country map of layer 3. After sequential enlargement, when a still further enlargement operation is entered while the city outline map of layer 5 is displayed, a detailed city map of layer 6 is displayed.

On the other hand, while in display of the detailed city map of layer 6, if a reduce operation is entered, its display is reduced so as to show the outline city map of layer 5. If a still further reduction operation is entered, the display is still further reduced so as to show the regional map of layer 4. After sequential reduction, if a reduction operation is entered while in display of the world regional map of layer 2, the world map of layer 1 is displayed.

Figure 14:
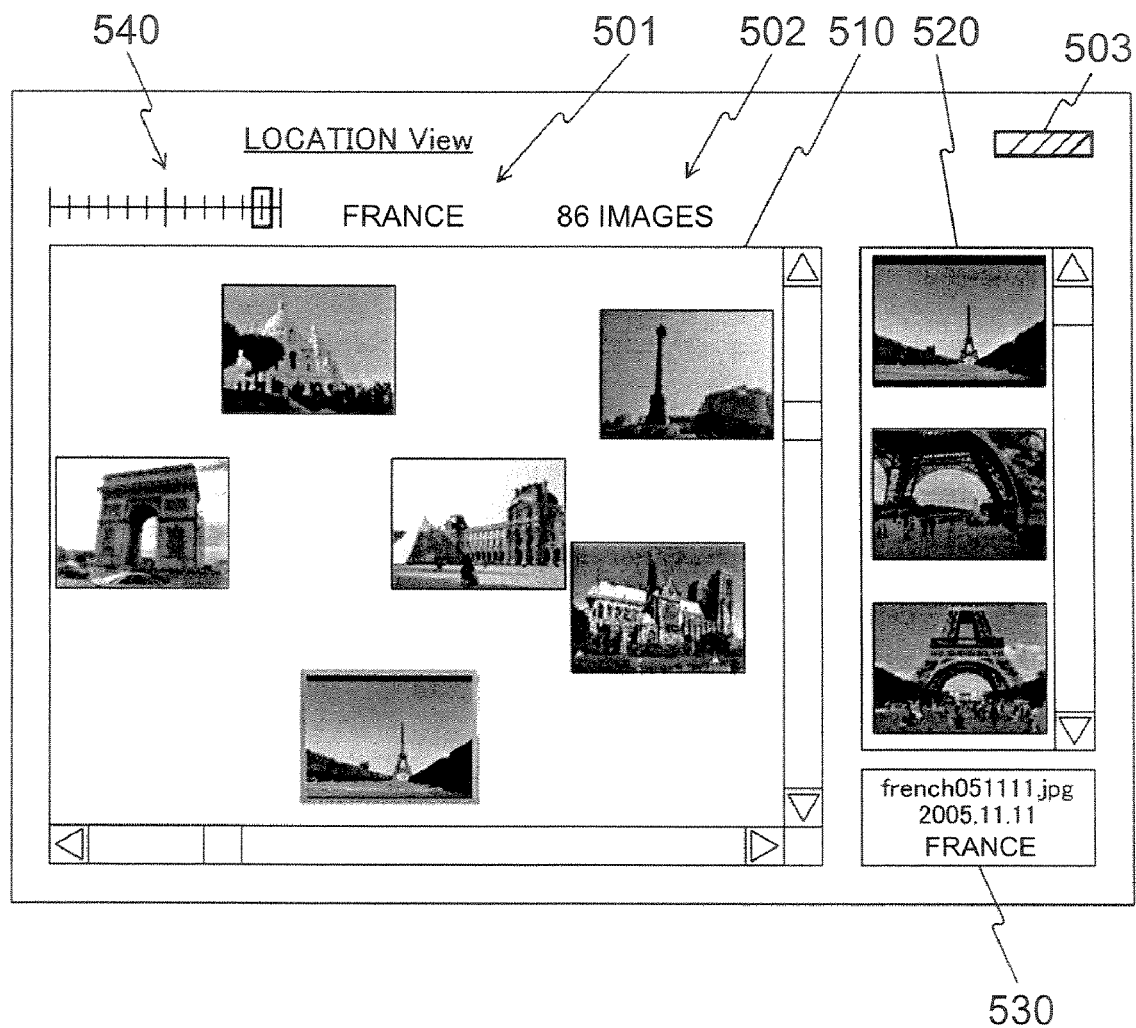
FIG. 14 is a diagram showing an example of display according to an application embodying the invention.

FIG. 14 is an example of a display in an application according to an embodiment of the invention. In this example of display, a window 510 for displaying an image locations display and a window 520 for displaying thumbnail-images are shown. In the window 510, as a detailed city map of layer 6, image-capturing locations of image data are displayed at their relative positions. When an icon is selected in this window 510, it may be arranged so that the selected icon is allowed to be displayed in the center thereof. Further, if any corresponding map exists, this map may be displayed in the window 510.

Further, thumbnail-images corresponding to the icon selected in the window 510 are displayed in a window 520. Still further, file information 530 of image data corresponding to a thumbnail-image selected in the window 520 is indicated below the window 520.

In the upper left direction of this exemplary display, an enlarge/reduce bar 540 is indicated whereby to be able to know the present enlargement ratio. By slide operation of this enlarge/reduce bar 540, an enlargement or reduction operation can be entered. When an enlargement operation is entered while in the state of displaying a map in window 510, the map is enlarged until its enlargement ratio reaches a predetermined extent. When it exceeds the predetermined extent, the map is altered to the next layer, and respective positions of icons are also updated. Alternatively, in order to return to the previous layer, a reduction operation is performed.

Further, as other displays indicated here, a representative place name 501 of the map in display, the number of image data 502 as objectives of display, a battery capacity 503 and the like are indicated.

Figure 15:
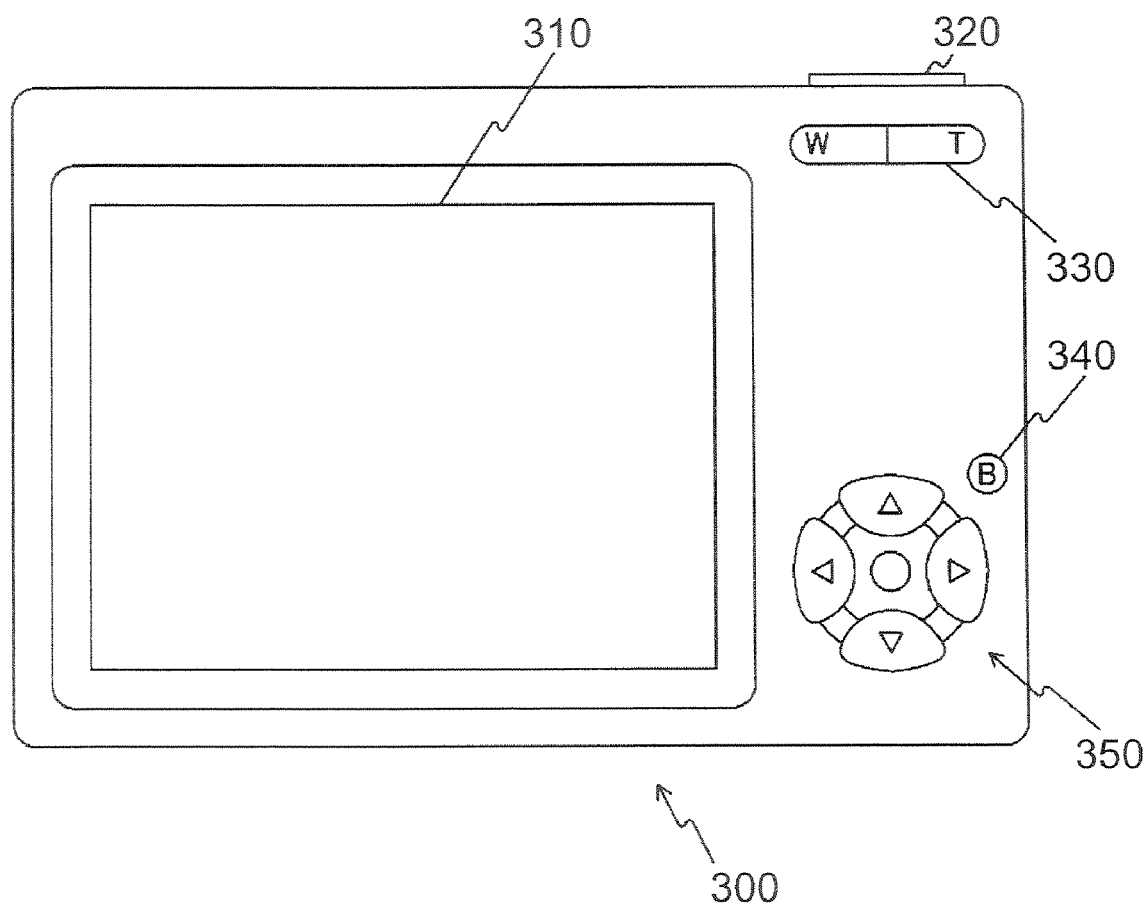
FIG. 15 is a diagram showing an example of appearance of a digital still camera 300 incorporating the imaging apparatus 100 and the image display apparatus 200 embodying the invention.

FIG. 15 is a schematic diagram showing an example of appearance of a digital still camera 300 embodying the imaging apparatus 100 and the image display apparatus 200 according to an embodiment of the invention. On an operating surface of the digital still camera 300, there are provided a display 310 for displaying a capturing image, a zoom button 330 for accepting a zooming operation to enlarge or reduce, a return button 340 for returning to the previous state, and a direction button 350 for accepting a directional instruction operation in the display 310. Further, on the upper side of this digital still camera 300, a shutter button 320 for instructing to record a focused image is provided.

The user instructs an enlargement operation by pressing a teleview side (T) of the zoom button 330, and instructs a reducing operation by pressing a wide-view side (W) of the zoom button 330. These operations are carried out not only during image capturing, but also during the image location display on the display 310.

Further, the user is able to use the direction button 350 when selecting a folder or a thumbnail in the image location display windows 510 and 520. Still further, when returning from the window 520 to the window 510, the return button 340 may be used.

Hereinabove, a method of operation of the image location display has been described by way of example using the zoom button 330, the direction button 350 and the like, however, it is not limited thereto, and when the display 310 is of a touch-panel type, the image location display operation may be instructed directly to the display 310.

Figure 16:
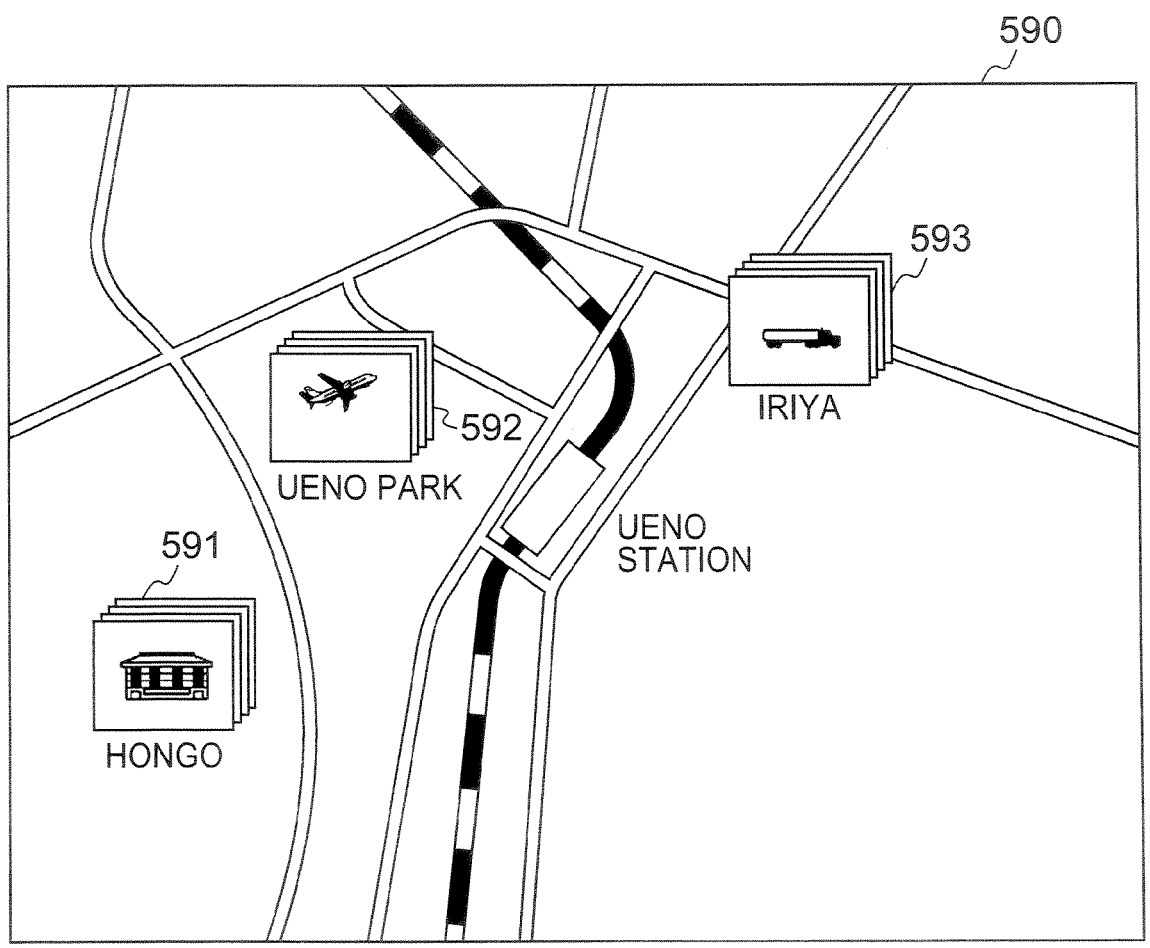
FIG. 16 is a diagram showing an example of display prior to conditional filtering according to the embodiment of the invention.

FIG. 16 is a diagram showing an exemplary display prior to a conditional filtering according to an embodiment of the present invention. Here, as an image location display 590 in which a map is displayed in the background, thumbnail-image groups 591 to 593 are displayed thereon at respective positions corresponding to respective image-capturing locations of the image data.

Here, suppose that the number of thumbnails and the number of image data corresponding thereto are proportional, and that there exist 20 pieces of image data per thumb-mail. In this example having thumbnail groups from 591 to 593, at three locations named "Hongo", "Ueno Park" and "Iriya", there exist 80 pieces of image data, respectively.

FIG. 17 is a table showing an example of breakdown details of image-capturing times of the image data in the example shown in FIG. 16. Here, as an example, it is shown that at a location named "Hongo" there exist 40 pieces of image data in the years 2003 and 2004, respectively, that at a location named "Ueno Park" there exist 20 pieces thereof in the years 2003 and 2004, respectively, and 40 pieces thereof in the year of 2005, and that at a location named "Iriya" there exist 80 pieces of image data in the year of 2003.

Namely, it means that in the 3 years from 2003 to 2005, at respective three locations named "Hongo", "Ueno Park" and "Iriya", there exist 80 pieces of image data, respectively.

In the present section, the image-capturing times 625 is described by referring to the years in which the images were captured, however, there can be recorded the months, days, hours, minutes and even seconds at which the images were captured.

FIG. 18 is a diagram showing an example of a designation screen for designating filtering conditions according to an embodiment of the present invention. Here, designation boxes for designating start times of filtering are aligned along the left side column, and boxes for designating end times of filtering are aligned along the right side column, respectively.

In the column for designating a start time, there are indicated a filter selection button 571, a designation value display box 572, and a designation instruction button 573. The filter selection button 571 is for selecting whether or not a corresponding item such as years, months or the like is to be used as a filtering condition. Upon marking a corresponding item to be used (x-marked in the figure), this x-marked corresponding item is selected as a filtering condition.

The designation value display box 572 displays an entered value of the corresponding item. The value displayed in the designation value display box 572 changes in response to the user's operation of the designation instruction button 573. For example, by pressing once the upper side of the designation instruction button 573 corresponding to the year, the display of year in the designation value display box 572 is incremented by one year, while by pressing once the bottom side of the designation instruction button 573 corresponding to the year, the display of year in the designation value display box 572 is decremented by one year.

In this example, as other filtering conditions, the seasons of the year can be designated. Accordingly, if "spring" is designated, a period from March to May is selected, if "summer" is designated, a period from June to August, is selected, if "autumn" is designated, a period from September to November is selected, and if "winter" is designated, a period from December to February is selected, respectively, as a filtering condition.

Figure 19:
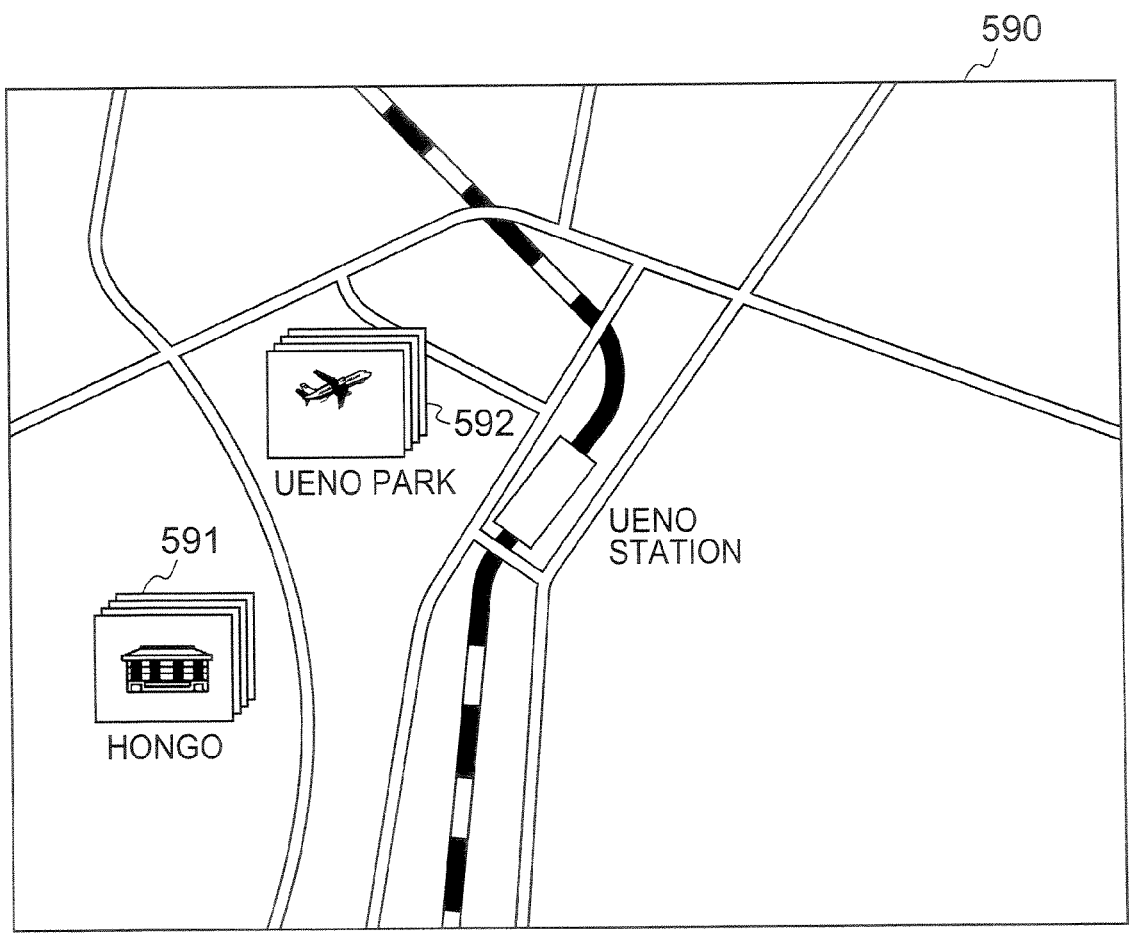
FIG. 19 is a diagram showing an example of display after the conditional filtering.

FIG. 19 shows an example of display after the conditional filtering according to an embodiment of the present invention. As a result of filtering with the designated conditions as described in FIG. 18, the number of objects in display is narrowed down from those in FIG. 16. In other words, the numbers of thumbnail images at the places named "Hongo" and "Ueno Park" are reduced, and the thumbnail corresponding to the place named "Iriya" is not displayed.

As described hereinabove, by carrying out the filtering on the map with the conditions of the image-capturing time, a more intuitive search of image data through the memory of the user is able to be realized.

Next, an operation of the image display apparatus 200 according to an embodiment of the present invention will be described by referring to the accompanying drawings.

Figure 20:
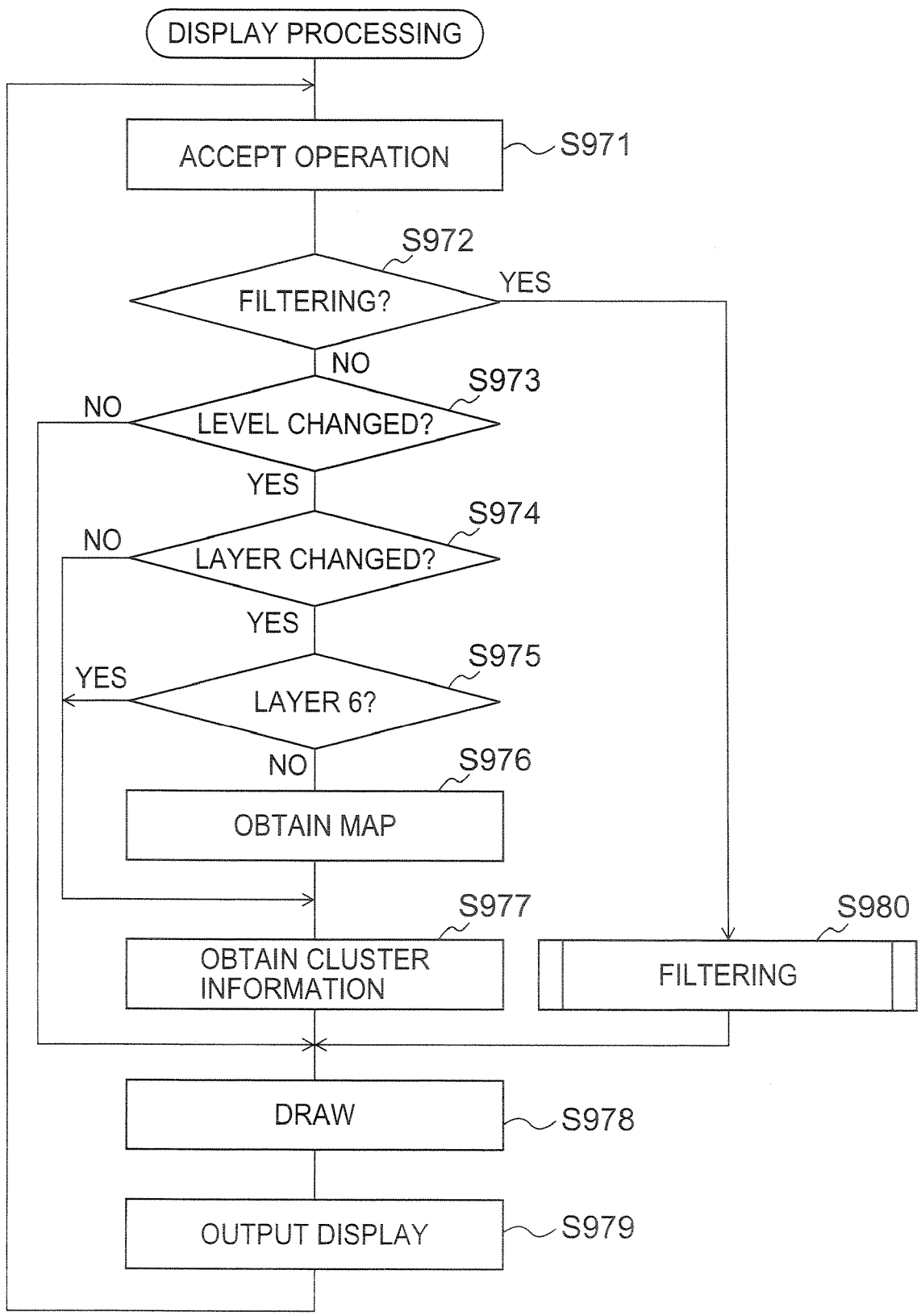
FIG. 20 is a flowchart showing an example of sequential steps in an image location display processing according to the embodiment of the invention.

FIG. 20 is a flowchart showing an example of process sequences of an image location display processing according to an embodiment of the present invention. When a user's operation via the operation section 250 is accepted (step S971), it is determined whether it is a filtering instruction or not (step S972). If it is a filtering instruction, a filtering in accordance with its filtering condition is carried out (step S980). On the other hand, if it is an enlargement or reduction operation, it is determined in the display layer determining section 260 whether or not any change of layers/or levels occurred.

Subsequently, if some change occurred in the layer and/or level (step S973 and S974), the map obtaining section 240 obtains a map to be displayed in the next from the map information database 800 (step S976). However, as in the case of the layer 6 shown in FIG. 14, if no corresponding map exists in the map information database 800, no map is obtained (step S975).

Further, cluster information corresponding to the map is obtained from cluster storage 220 by a cluster managing section 230 (step S977). By way of example, when a change occurred not in layer but in level, although no map is obtained, cluster information corresponding to a new level is obtained.

On the basis of the map and the cluster information obtained as described above, the drawing section 280 executes a drawing processing (step S978), and an output thereof is displayed on the display section 290 (step S979). Subsequently, the process steps starting from the step S971 is repeated.

Figure 21:
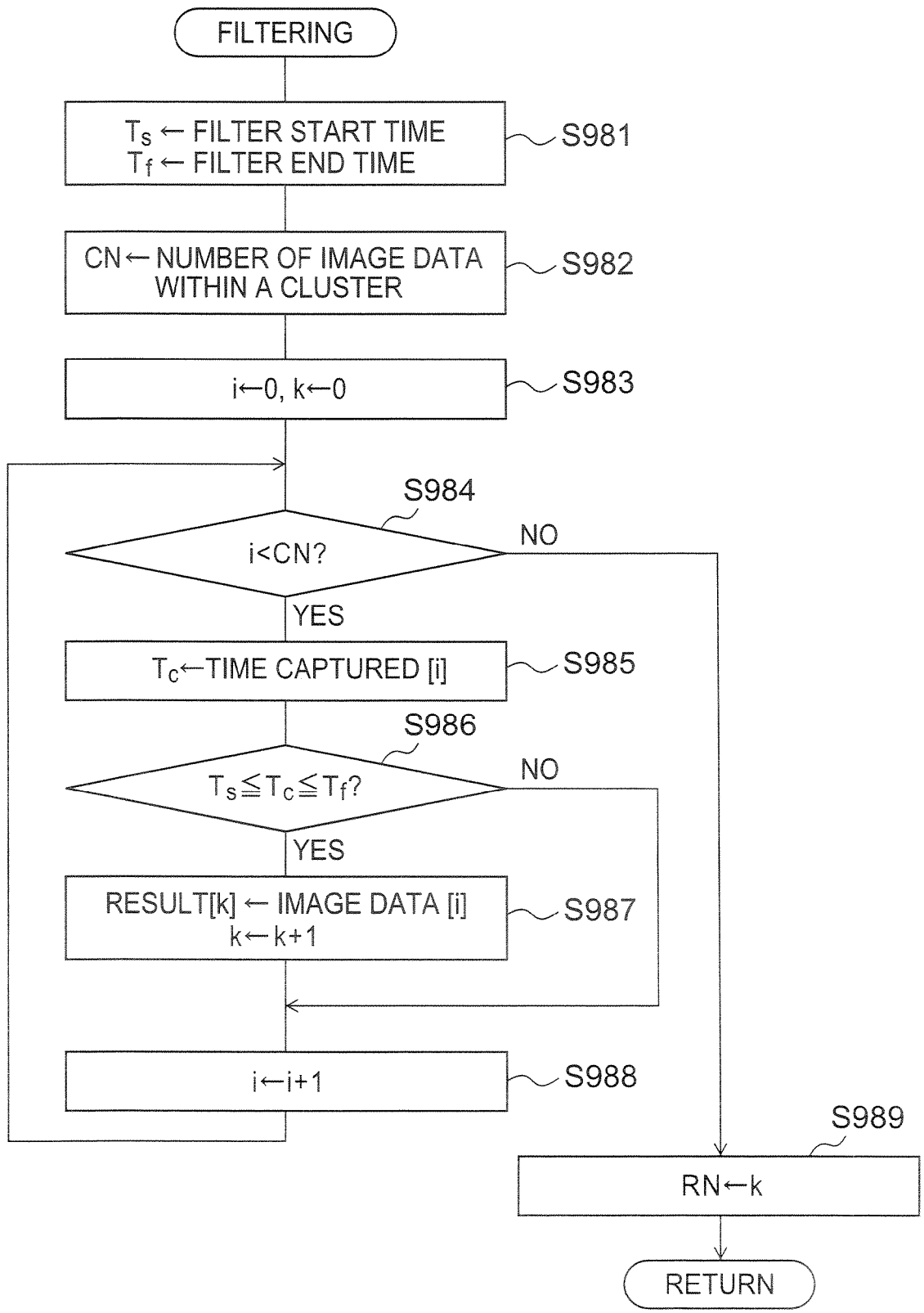
FIG. 21 is a flowchart showing an example of sequential steps in a filtering processing according to the embodiment of the invention.

FIG. 21 is a flowchart showing an example of sequential steps of a filtering processing (step S980) according to an embodiment of the present invention. First of all, a start time (filter start time) of filtering designated by the user is set as Ts, and an end time (filter end time) of filtering designated by the user is set as Tf, respectively (step S981). The number of image data in clusters 660 retained in the cluster storage section 220 is set as CN (step S982) Then, index i of image data and index k of a result list are reset to 0, respectively (step S983).

If index i of an image data is equal to or smaller than CN which is the number of the image data in the cluster (step S984), an image capturing-time of the i-th image data is set as Tc (step S985). Then, if this image capturing-time Tc is equal to or larger than the filtering start time Ts and equal to or smaller than the filtering end time Tf (step S986), the i-th image data is registered at a k-th in the result list, and the index k of the result list is incremented by one (step S987).

Process steps following the step S984 are repeated while incrementing the image data index i one by one, until the image data index i is equal to CN or larger. CN is the number of image data in the cluster (step S984).

If the index i of the image data is equal to or larger than CN, which is the number of image data in the cluster, the index k of the result list at that moment is set as RN (step S989), completing the filtering process. Consequently, a total of RN pieces of image data which were registered corresponding from the 0-th to the "RN-1"th of the result list are obtained as having matched the filtering conditions.

As described heretofore, according to the embodiment of the present invention, the cluster management for managing the image data in the cluster storage 220 in the hierarchical cluster management system can be significantly simplified by fixing a part of the hierarchical clusters as the fixed cluster. Further, the image data is able to be intuitively searched on the map by allowing the conditional filtering section 235 to carry out filtering on the basis of a filtering condition designated via the operation section 250.

According to the embodiments of the present invention described hereinabove, although symbol displays in the layer 1 through layer 5 are described to be a fixed display, and a symbol display in layer 6 to be a relative position display, however, it is not limited thereto, and a relative position display may be applied also in any upper layers higher than layer 5. Further, although it is considered that the maps corresponding to the layer 1 through layer 5 exist in the map information database 800, and that the map corresponding to the layer 6 does not exist, however, it is not limited thereto, and the invention is applicable as well even if there does not exist a map corresponding to a certain upper layer higher than the layer 5. In other words, according to the embodiment of the present invention, a border between the fixed cluster and the variable cluster is considered to exist between the layer 5 and the layer 6, and an exemplary case was described where maps are provided for fixed clusters, and enabling the symbol display by means of a fixed display, while for the variable clusters, without providing the maps, a relative position display of the symbol display is enabled. However, the present invention is not limited thereto.

The foregoing embodiments of the present invention described heretofore show only exemplary examples for implementing the invention with a particular correspondence to appended claims, however, the present invention is not limited thereto, and various changes, modifications and combinations thereof should be construed to be within the scope of the present invention.

In the claims section, the image information storage means corresponds, for example, to the cluster storage section 220. Further, the cluster managing means corresponds, for example, to the cluster managing section 230. The drawing means corresponds, for example, to the drawing section 280. Further, the display condition designation means corresponds, for example, to the operation section 250. The conditional filtering means corresponds, for example, to the conditional filtering section 235. Further, the display layer determining means corresponds, for example, to the display layer determining section 260.

In the claims section, the map storage means corresponds, for example, to the map information database 800. The map obtaining means corresponds, for example, to the map obtaining section 240.

In the claims section, the image information storage means corresponds, for example, to the cluster storage section 220. The cluster managing means corresponds to the cluster managing section 230. The drawing means corresponds to the drawing section 280. The display condition designation means corresponds, for example, to the operation section 250. Further, the conditional filtering means corresponds, for example, to the conditional filtering section 235. The image data storage means corresponds, for example, to the image storage section 210.

Further, in the claims section, the image information storage means corresponds, for example, to the cluster storage section 220. The steps for designating a layer to be displayed as a display layer from an uppermost layer through a lowermost layer in a plurality of layers, and the steps for designating a display condition of image data correspond, for example, to the step S971 in FIG. 20. Further, the step of selecting only such image data in the display layer that the image information thereof resides within a predetermined range on the basis of the display condition corresponds, for example, to step S980 in FIGS. 20 and 21. Still further the step of drawing the captured location of the image data selected on the basis of the image information as an image location display in a display layer corresponds, for example, to the step S978 in FIG. 20.

By way of example, the process steps described in the foregoing embodiments of the present invention may well be construed as a method including a series of these steps, or as a program and/or a recording medium for recording the program to be executed by a computer.

The present application contains subject matter related to Japanese Patent Application JP 2005-351401 filed in the Japanese Patent Office on Dec. 6, 2005, the entire content of which being incorporated herein by reference.

What is claimed is:

1. An image display apparatus comprising:
image information storage means for storing image information including at least locations where images are captured as information corresponding to captured image data;
cluster managing means for managing the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers,
the hierarchical structure fixed from the uppermost layer to a predetermined layer such that a branch node and a candidate node are recursively updated only between the predetermined layer and the lowermost layer to add new image data;
display layer designation means for designating a layer to be displayed as a display layer among from the uppermost layer through the lowermost layer in the plurality of layers;
display condition designation means for designating a display condition of the image data;
conditional filtering means for selecting image data in the display layer having image information corresponding to a predetermined range based on the display condition; and
drawing means for drawing in the display layer, as an image location display, the image captured locations of the image data, which is selected based on the image information, the cluster managing means further:
setting the branch node to a node directly beneath the predetermined layer having image location information that is closer in distance to location information of the new image data than image location information associated with each another node in the layer directly beneath the predetermined layer,
setting the candidate node to a first node lower than the branch node, the first node associated with a first cluster of nodes, the first node having image location information that is closer in distance to the location information of the new image data than image location information associated with a second node lower than the branch node, the second node associated with a second cluster of nodes, and
recursively updating the branch node to the candidate node upon determination that a maximum distance between the image location information of the first node and image location information of each other node included in the first cluster is larger than a distance between the image location information of the first node and the location information of the new image data.

2. The image display apparatus as claimed in claim 1, wherein:
in the hierarchical structure of clusters including the plurality of clusters configured in the plurality of layers, the hierarchical structure is fixed from the uppermost layer to the predetermined layer such that the image information is added to the hierarchical structure only between the predetermined layer and the lowermost layer.

3. The image display apparatus as claimed in claim 1, further comprising:
map storage means for storing maps corresponding to the uppermost layer to the predetermined layer; and
map obtaining means for obtaining a map corresponding to the display layer if the map is stored in the map storage means, wherein
if the map corresponding to the display layer is stored in the map storage means, the drawing means draws the map obtained by the map obtaining means together with the image location display superposed thereon.

4. The image display apparatus as claimed in claim 1, wherein
the image information contains an image-capturing time of the image data,
the display condition contains a predetermined range of the image-capturing time of the image data, and
the conditional filtering means selects only such image data having an image-capturing time contained in the image information corresponding to the predetermined range of the image-capturing time.

5. The image display apparatus as claimed in claim 4, wherein
the predetermined range of the image-capturing time in the display condition is designated by a season of the year.

6. An image management apparatus comprising:
image information storage means for storing image information including at least locations where images are captured as information corresponding to captured image data;
cluster managing means for managing the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers, the hierarchical structure fixed from the uppermost layer to a predetermined layer such that a branch node and a candidate node are recursively updated only between the predetermined layer and the lowermost layer to add new image data;

selection layer designation means for designating a layer to be selected as a selection layer among from the uppermost layer through the lowermost layer in the plurality of layers;

selection condition designation means for designating a selection condition of the image data;

conditional filtering means for selecting image data in the selection layer having image information corresponding to a predetermined range based on the selection condition; and image data storage means for storing the image data selected on the basis of the image information in the selection layer, the cluster managing means further:

setting the branch node to a node directly beneath the predetermined layer having image location information that is closer in distance to location information of the new image data than image location information associated with each another node in the layer directly beneath the predetermined layer, setting the candidate node to a first node lower than the branch node, the first node associated with a first cluster of nodes, the first node having image location information that is closer in distance to the location information of the new image data than image location information associated with a second node lower than the branch node, the second node associated with a second cluster of nodes, and recursively updating the branch node to the candidate node upon determination that a maximum distance between the image location information of the first node and image location information of each other node included in the first cluster is larger than a distance between the image location information of the first node and the location information of the new image data.

7. An image display method for use in an image display apparatus, the method comprising:

storing image information including at least image capturing locations and capturing times of captured image data;

managing the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers, the hierarchical structure fixed from the uppermost layer to a predetermined layer such that a branch node and a candidate node are recursively updated only between the predetermined layer and the lowermost layer to add new image data;

designating a layer to be displayed as a display layer among from the uppermost layer to the lowermost layer in the plurality of layers;

designating a display condition of image data;

selecting image data having image information corresponding to a predetermined range based on the display condition in the display layer;

drawing, as an image location display, an image-capturing location of the image data selected based on the image information in the display layer;

setting the branch node to a node directly beneath the predetermined layer having image location information that is closer in distance to location information of the new image data than image location information associated with each another node in the layer directly beneath the predetermined layer;

setting the candidate node to a first node lower than the branch node, the first node associated with a first cluster of nodes, the first node having image location information that is closer in distance to the location information of the new image data than image location information associated with a second node lower than the branch node, the second node associated with a second cluster of nodes; and recursively updating the branch node to the candidate node upon determination that a maximum distance between the image location information of the first node and image location information of each other node included in the first cluster is larger than a distance between the image location information of the first node and the location information of the new image data.

8. A non-transitory computer readable storage medium having stored thereon computer executable instructions that when executed by a processor in an image display apparatus, cause the image display apparatus to execute a method comprising:

storing image information including at least image capturing locations and capturing times of captured image data;

managing the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers, the hierarchical structure fixed from the uppermost layer to a predetermined layer such that a branch node and a candidate node are recursively updated only between the predetermined layer and the lowermost layer to add new image data;

designating a layer to be displayed as a display layer among from the uppermost layer to the lowermost layer in the plurality of layers;

designating a display condition of image data;

selecting image data having image information corresponding to a predetermined range based on the display condition in the display layer;

drawing, as an image location display, an image-capturing location of the image data selected based on the image information in the display layer;

setting the branch node to a node directly beneath the predetermined layer having image location information that is closer in distance to location information of the new image data than image location information associated with each another node in the layer directly beneath the predetermined layer;

setting the candidate node to a first node lower than the branch node, the first node associated with a first cluster of nodes, the first node having image location information that is closer in distance to the location information of the new image data than image location information associated with a second node lower than the branch node, the second node associated with a second cluster of nodes; and recursively updating the branch node to the candidate node upon determination that a maximum distance between the image location information of the first node and image location information of each other node included in the first cluster is larger than a distance between the image location information of the first node and the location information of the new image data.

9. An image display apparatus comprising:
an image information storage section configured to store image information including at least locations where images are captured as information corresponding to captured image data;
a cluster managing section configured to manage the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers,
the hierarchical structure fixed from the uppermost layer to a predetermined layer such that a branch node and a candidate node are recursively updated only between the predetermined layer and the lowermost layer to add new image data;
a display layer designation section configured to designate a layer to be displayed as a display layer among from the uppermost layer through the lowermost layer in the plurality of layers;
a display condition designation section configured to designate a display condition of the image data;
a conditional filtering section configured to select image data in the display layer having image information corresponding to a predetermined range based on the display condition; and
a drawing section configured to draw in the display layer, as an image location display, the image captured locations of the image data, which is selected based on the image information,
the cluster managing section further configured to:
set the branch node to a node directly beneath the predetermined layer having image location information that is closer in distance to location information of the new image data than image location information associated with each another node in the layer directly beneath the predetermined layer,
set the candidate node to a first node lower than the branch node, the first node associated with a first cluster of nodes, the first node having image location information that is closer in distance to the location information of the new image data than image location information associated with a second node lower than the branch node, the second node associated with a second cluster of nodes, and
recursively update the branch node to the candidate node upon determination that a maximum distance between the image location information of the first node and image location information of each other node included in the first cluster is larger than a distance between the image location information of the first node and the location information of the new image data.

10. An image management apparatus comprising:
an image information storage section configured to store image information including at least locations where images are captured as information corresponding to captured image data;
a cluster managing section configured to manage the image information within a hierarchical structure of clusters including a plurality of clusters configured in a plurality of layers, the image information including identifiers indicating a hierarchical relationship between the plurality of clusters within the hierarchical structure from an upper most layer to a lower most layer included in the plurality of layers,
the hierarchical structure fixed from the uppermost layer to a predetermined layer such that a branch node and a candidate node are recursively updated only between the predetermined layer and the lowermost layer to add new image data;
a selection layer designation section configured to designate a layer to be selected as a selection layer among from the uppermost layer through the lowermost layer in the plurality of layers;
a selection condition designation section configured to designate a selection condition of the image data;
a conditional filtering section configured to select image data in the selection layer having image information corresponding to a predetermined range based on the selection condition; and
an image data storage section configured to store the image data selected on the basis of the image information in the selection layer,
the cluster managing section further configured to:
set the branch node to a node directly beneath the predetermined layer having image location information that is closer in distance to location information of the new image data than image location information associated with each another node in the layer directly beneath the predetermined layer,
set the candidate node to a first node lower than the branch node, the first node associated with a first cluster of nodes, the first node having image location information that is closer in distance to the location information of the new image data than image location information associated with a second node lower than the branch node, the second node associated with a second cluster of nodes, and
recursively update the branch node to the candidate node upon determination that a maximum distance between the image location information of the first node and image location information of each other node included in the first cluster is larger than a distance between the image location information of the first node and the location information of the new image data.

11. The image display apparatus as claimed in claim 9, wherein:
in the hierarchical structure of clusters including the plurality of clusters configured in the plurality of layers, the hierarchical structure is fixed from the uppermost layer to the predetermined layer such that the image information is added to the hierarchical structure only between the predetermined layer and the lowermost layer.

12. The image display apparatus as claimed in claim 9, further comprising:
a map storage section configured to store maps corresponding to the uppermost layer to the predetermined layer; and a map obtaining section configured to obtain a map corresponding to the display layer if the map is stored in the map storage section, wherein if the map corresponding to the display layer is stored in the map storage section, the drawing means draws the map obtained by the map obtaining section together with the image location display superposed thereon.

13. The image display apparatus as claimed in claim 9, wherein the image information contains an image-capturing time of the image data, the display condition contains a predetermined range of the image-capturing time of the image data, and the conditional filtering means selects only such image data having an image-capturing time contained in the image information corresponding to the predetermined range of the image-capturing time.

14. The image display apparatus as claimed in claim 13, wherein the predetermined range of the image-capturing time in the display condition is designated by a season of the year.

* * * * *